United States Patent
Park et al.

(10) Patent No.: US 10,440,670 B2
(45) Date of Patent: Oct. 8, 2019

(54) METHOD FOR PERFORMANCE DEVICE-TO-DEVICE COMMUNICATION IN WIRELESS COMMUNICATION SYSTEM AND APPARATUS THEREFOR

(71) Applicant: LG ELECTRONICS INC., Seoul (KR)

(72) Inventors: Jonghyun Park, Seoul (KR); Hanbyul Seo, Seoul (KR); Seungmin Lee, Seoul (KR); Inkwon Seo, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 77 days.

(21) Appl. No.: 15/540,712

(22) PCT Filed: Dec. 7, 2015

(86) PCT No.: PCT/KR2015/013313
§ 371 (c)(1),
(2) Date: Jun. 29, 2017

(87) PCT Pub. No.: WO2016/108456
PCT Pub. Date: Jul. 7, 2016

(65) Prior Publication Data
US 2017/0367059 A1 Dec. 21, 2017

Related U.S. Application Data

(60) Provisional application No. 62/097,566, filed on Dec. 29, 2014.

(51) Int. Cl.
*H04W 56/00* (2009.01)
*H04W 36/30* (2009.01)
(Continued)

(52) U.S. Cl.
CPC ......... *H04W 56/001* (2013.01); *H04L 5/0048* (2013.01); *H04W 36/30* (2013.01);
(Continued)

(58) Field of Classification Search
CPC .......................... H04W 56/001; H04L 5/0048
See application file for complete search history.

(56) References Cited

U.S. PATENT DOCUMENTS 9,369,189 B2 * 6/2016 Yu ........................ H04L 5/0053
9,450,719 B2 * 9/2016 Park ...................... H04B 7/024
(Continued)

FOREIGN PATENT DOCUMENTS

KR   10-2014-0073077 A    6/2014
KR   10-2014-0073567 A    6/2014
(Continued)

*Primary Examiner* — Samina F Choudhry
(74) *Attorney, Agent, or Firm* — Birch, Stewart, Kolasch & Birch, LLP

(57) ABSTRACT

A method for performing, by a first UE, device-to-device (D2D) communication in a wireless communication system includes: transmitting, to a first eNB, transmission/reception (TX/RX) chain number information indicating the number of supported TX/RV radio frequency (RF) chains; receiving, from the first eNB, a first control message including D2D resource pool configuration information of the first eNB; receiving, from the first eNB, a second control message including D2D resource pool configuration information of a second eNB; and transmitting a first D2D signal to the first eNB and/or transmitting a second D2D signal to the second eNB using one or more TX RF chains when a predetermined condition is satisfied.

20 Claims, 17 Drawing Sheets

(51) Int. Cl.
  *H04L 5/00*    (2006.01)
  *H04W 72/04*   (2009.01)
  *H04W 72/10*   (2009.01)
  *H04W 88/02*   (2009.01)
  *H04W 84/00*   (2009.01)
  *H04W 36/00*   (2009.01)

(52) U.S. Cl.
  CPC ....... *H04W 56/00* (2013.01); *H04W 56/0015* (2013.01); *H04W 72/0406* (2013.01); *H04W 72/10* (2013.01); *H04W 36/03* (2018.08); *H04W 72/042* (2013.01); *H04W 84/00* (2013.01); *H04W 88/02* (2013.01)

(56) References Cited

U.S. PATENT DOCUMENTS 9,538,437 B2 *   1/2017   Taori .................... H04W 36/04
2002/0173272 A1 *  11/2002  Liang .................. H04W 72/1215
                                                           455/63.1
2007/0230403 A1 *  10/2007  Douglas ................ H04W 24/00
                                                           370/334
2013/0109301 A1    5/2013   Hakola et al.
2013/0208698 A1 *  8/2013   Taori .................... H04W 36/04
                                                           370/331
2014/0247802 A1 *  9/2014   Wijting .............. H04W 72/0453
                                                           370/329
2014/0328266 A1 *  11/2014  Yu ........................ H04L 5/0053
                                                           370/329
2014/0328329 A1    11/2014  Novlan et al.
2015/0119021 A1 *  4/2015   Song ................. H04W 52/0229
                                                           455/426.1

FOREIGN PATENT DOCUMENTS

KR   10-2014-0131761 A       11/2014
WO   WO-2013133608 A1 *      9/2013    ............. H04B 7/024

* cited by examiner

[Figure 1]
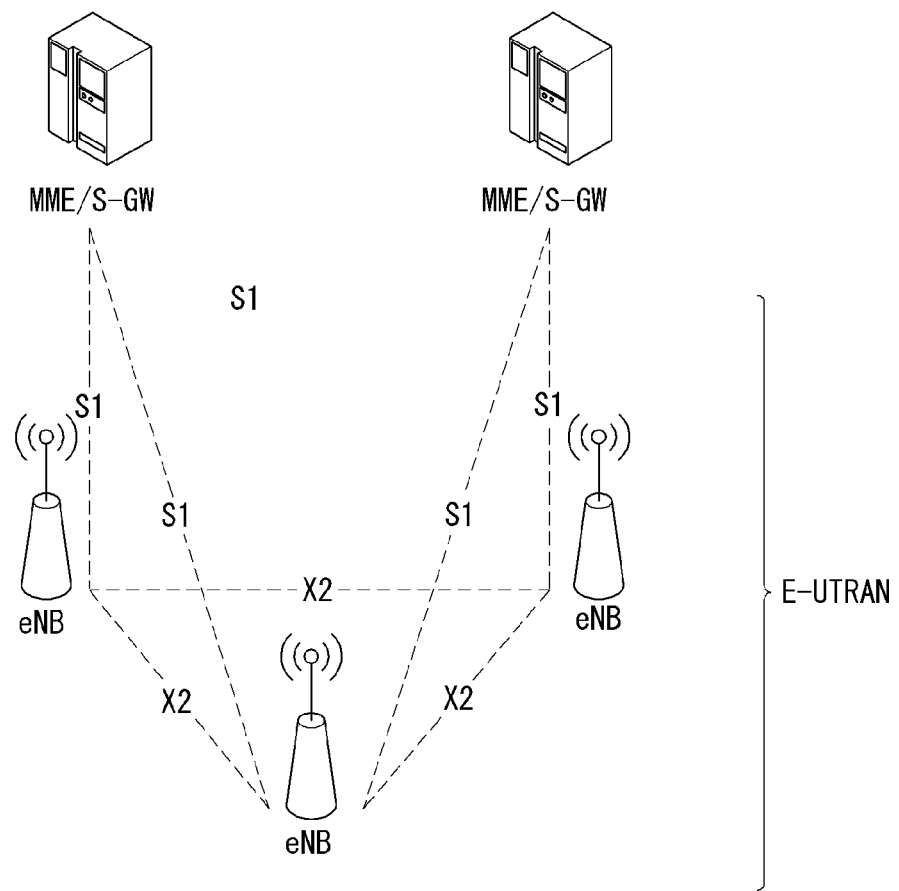

[Figure 2]
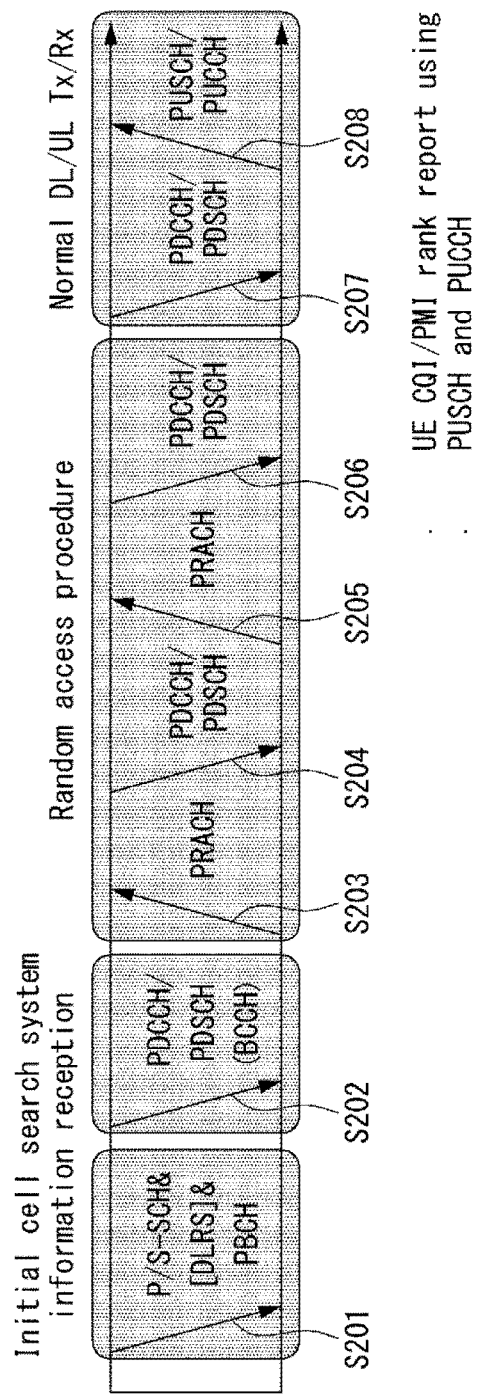

[Figure 3]
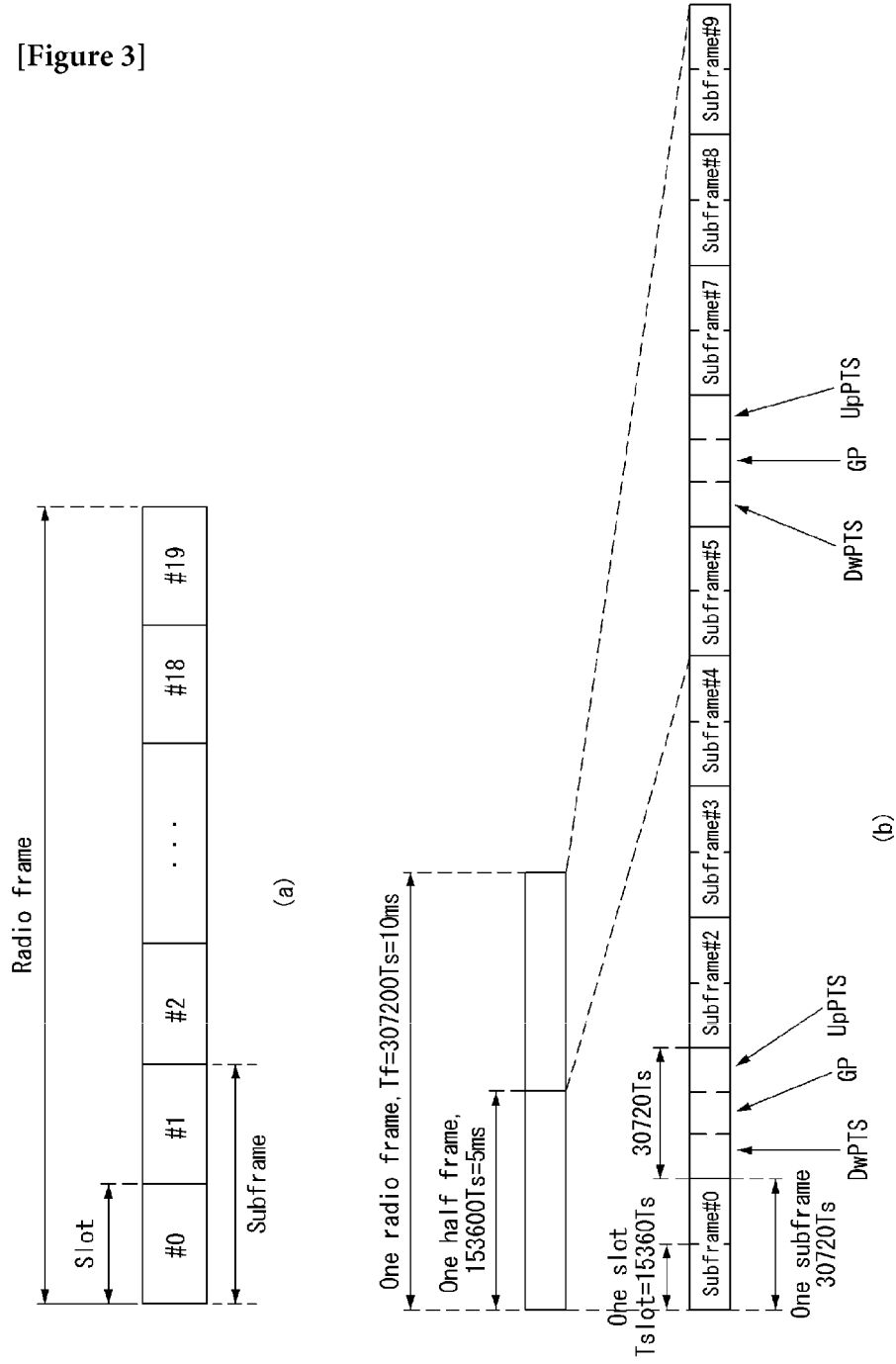

[Figure 4]
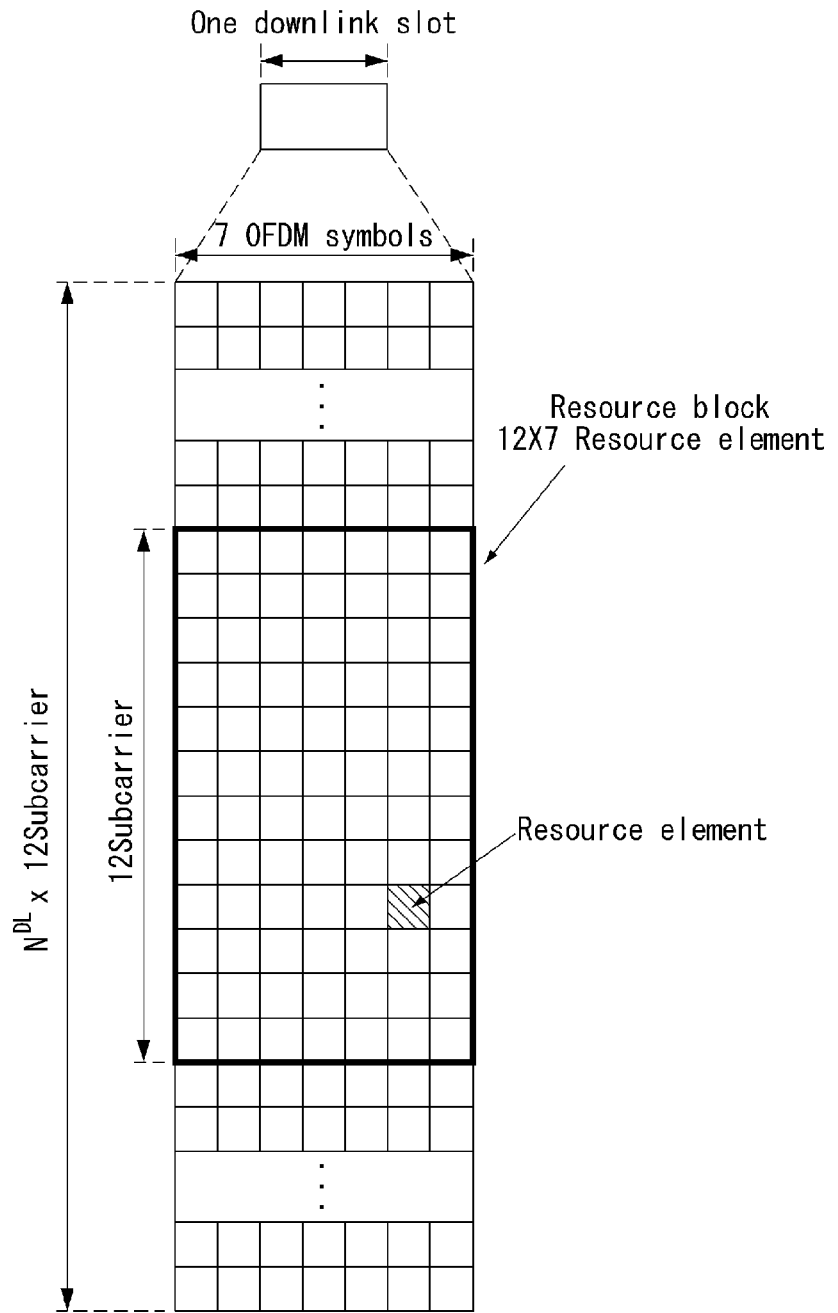

[Figure 5]
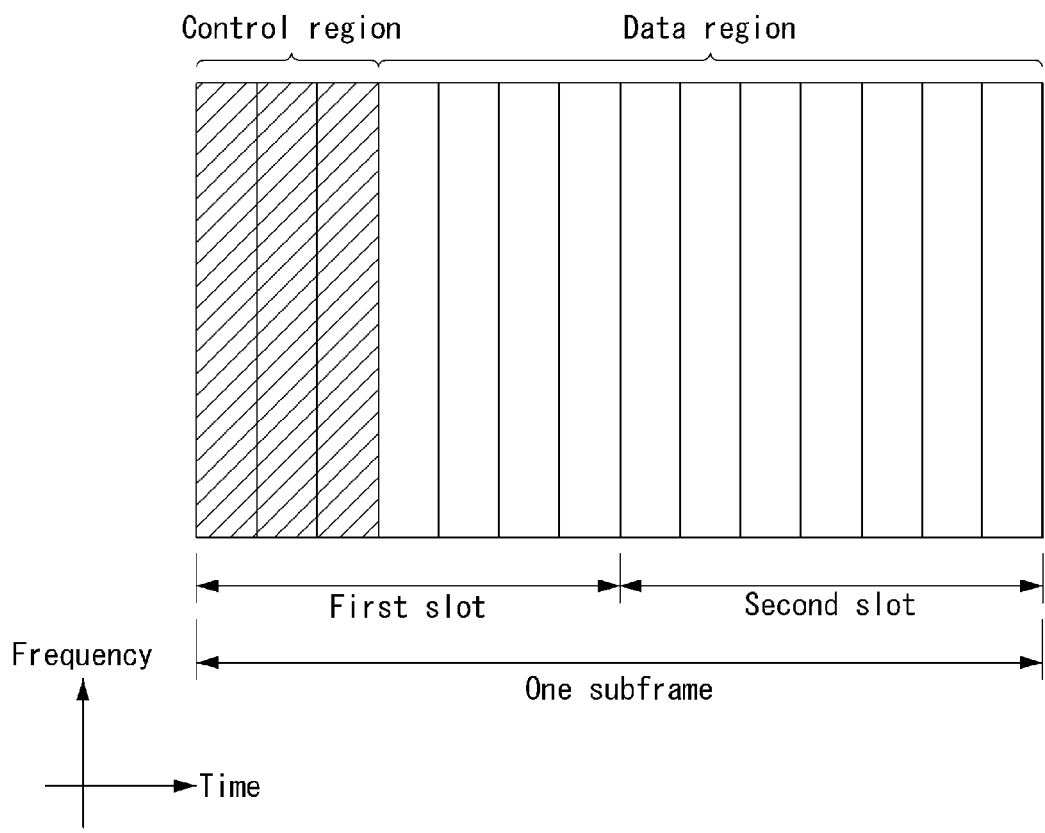

[Figure 6]
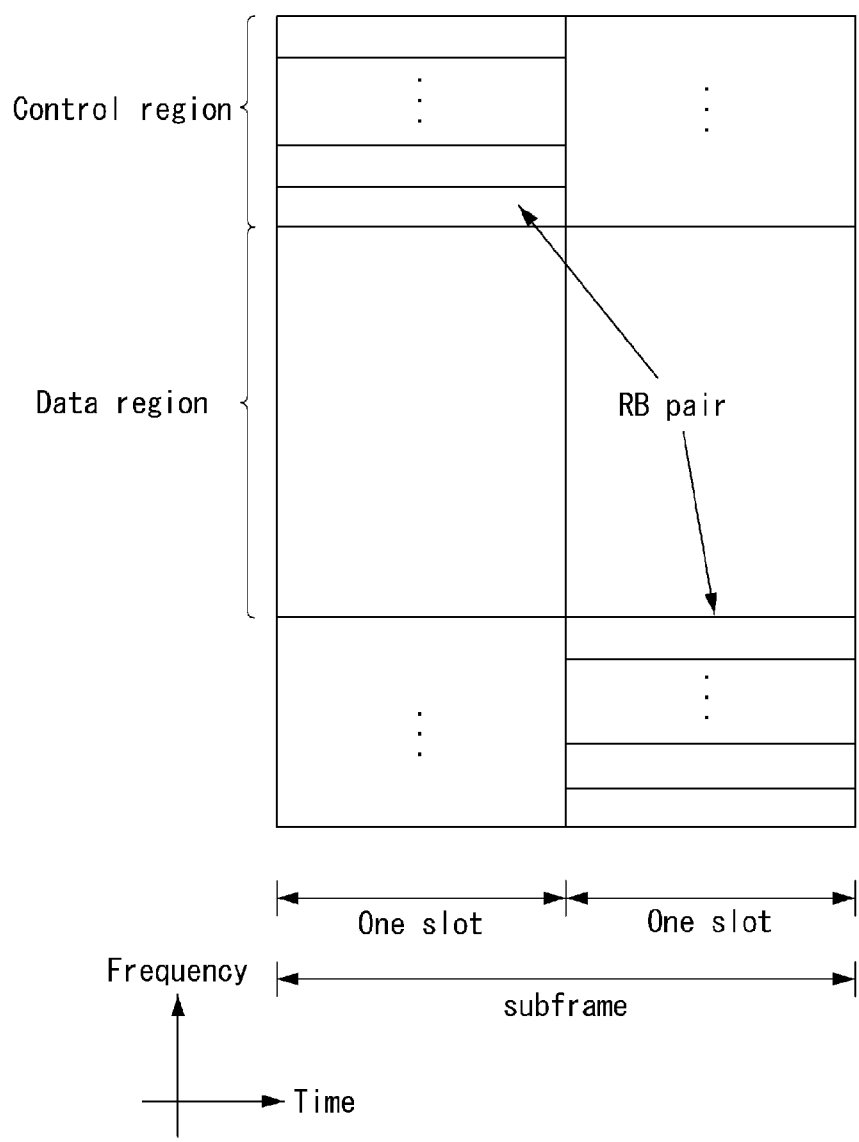

[Figure 7]
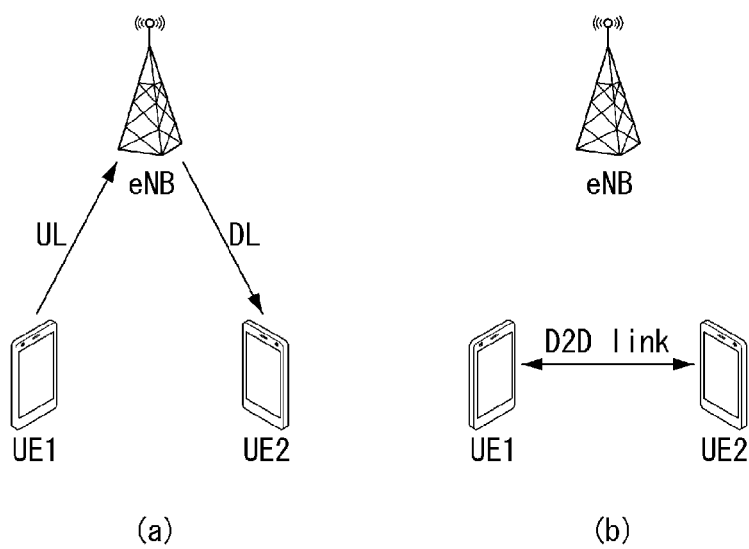

[Figure 8]
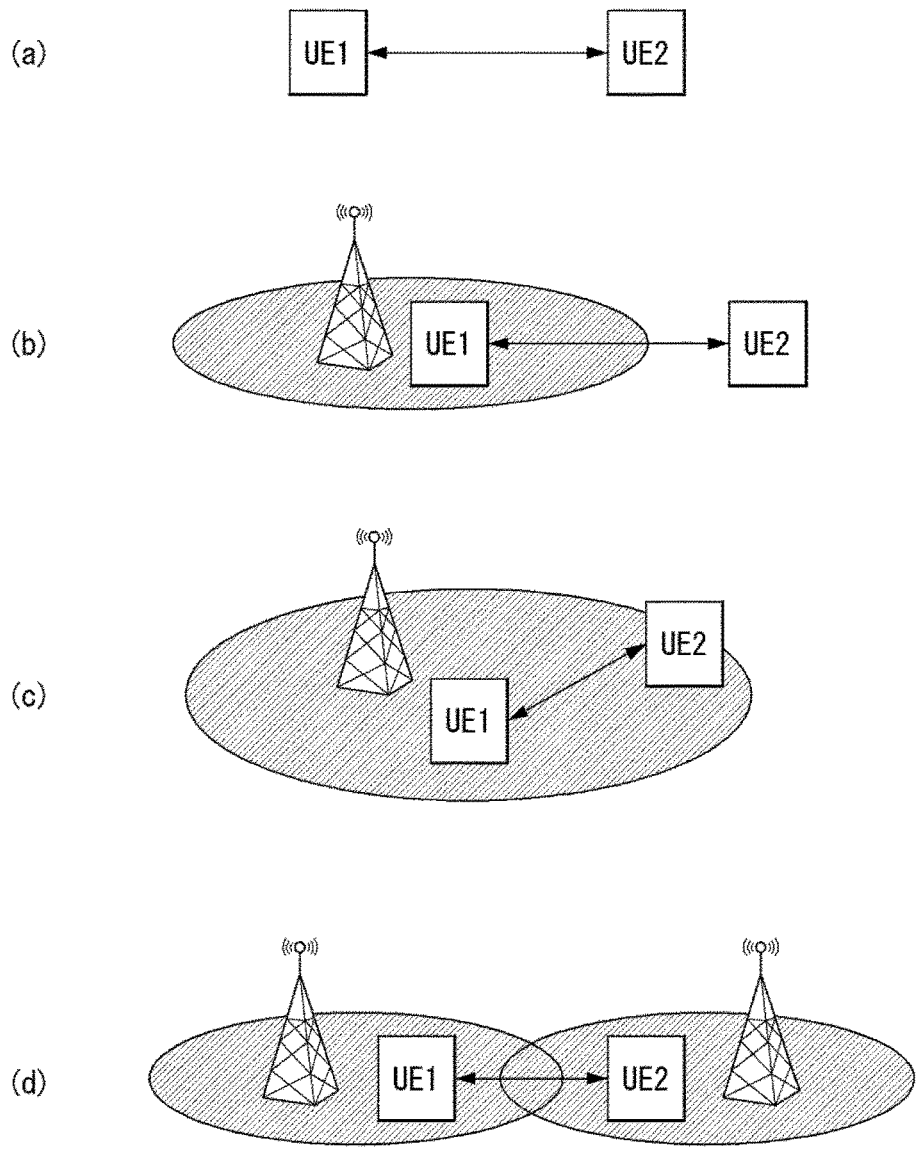

[Figure 9]
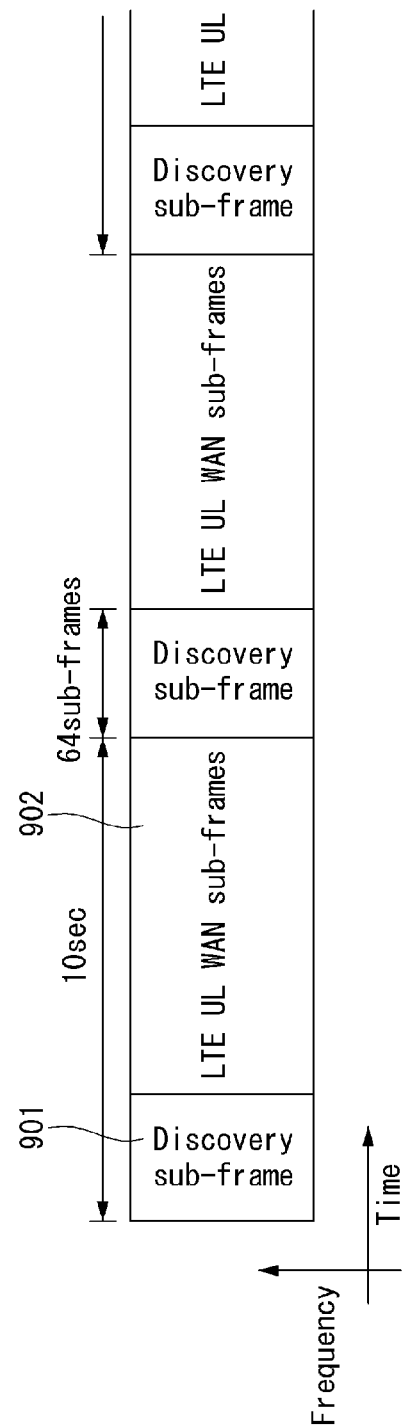

[Figure 10]
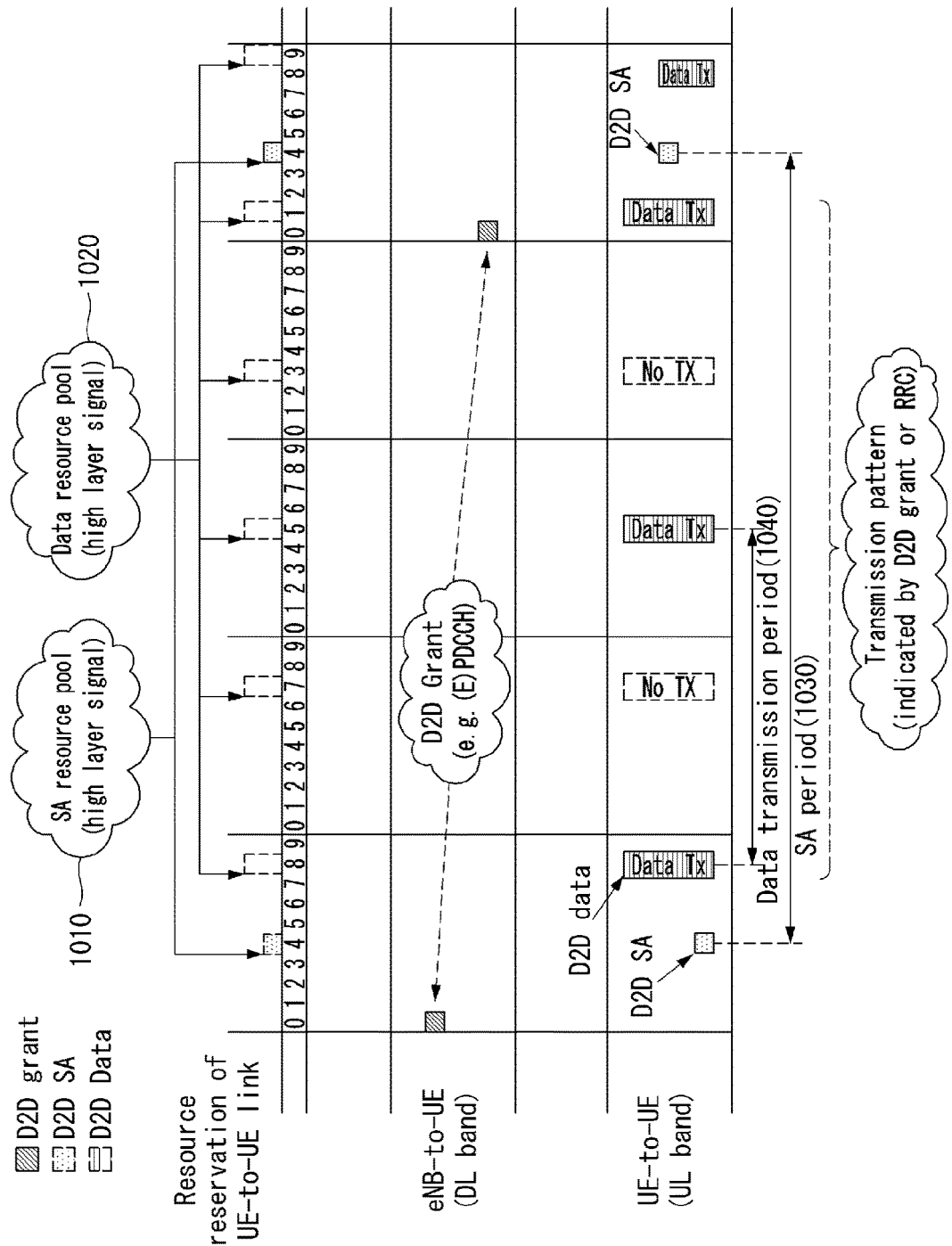

[Figure 11]
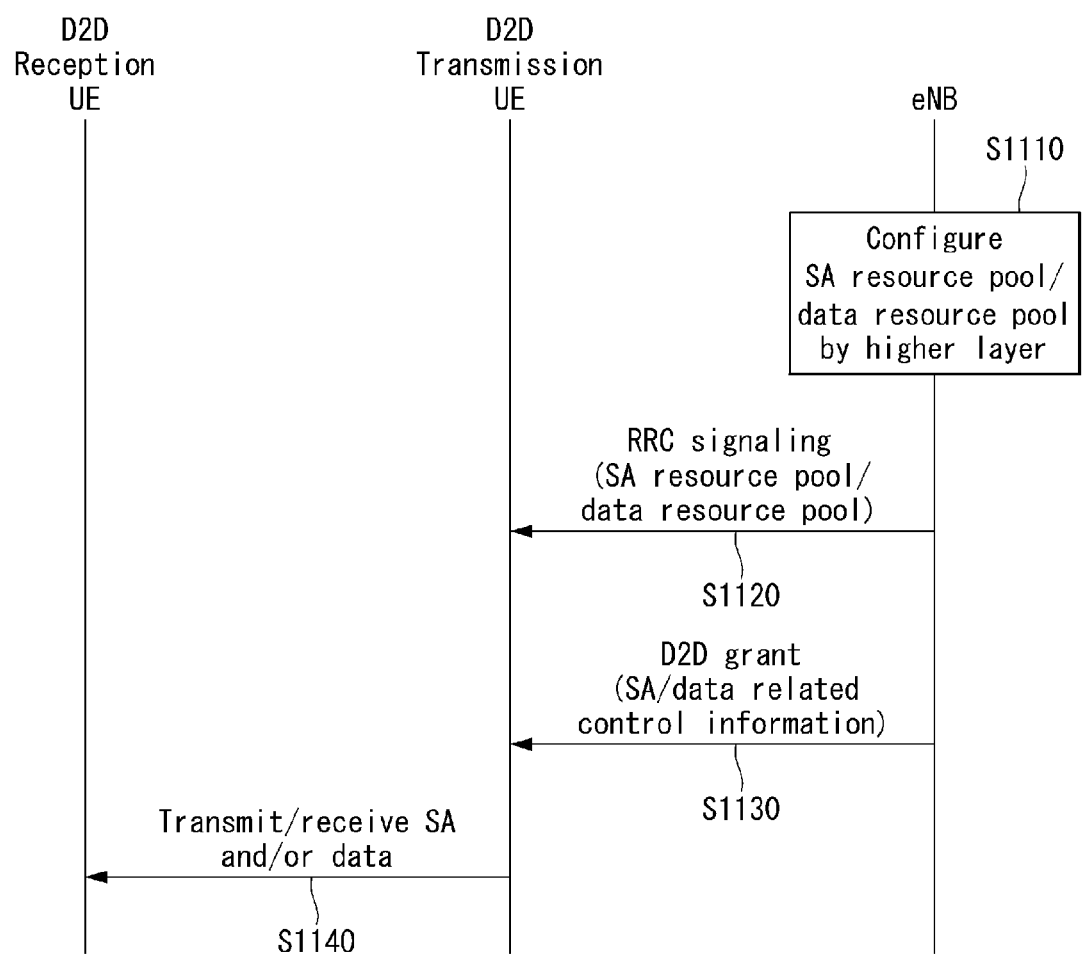

[Figure 12]
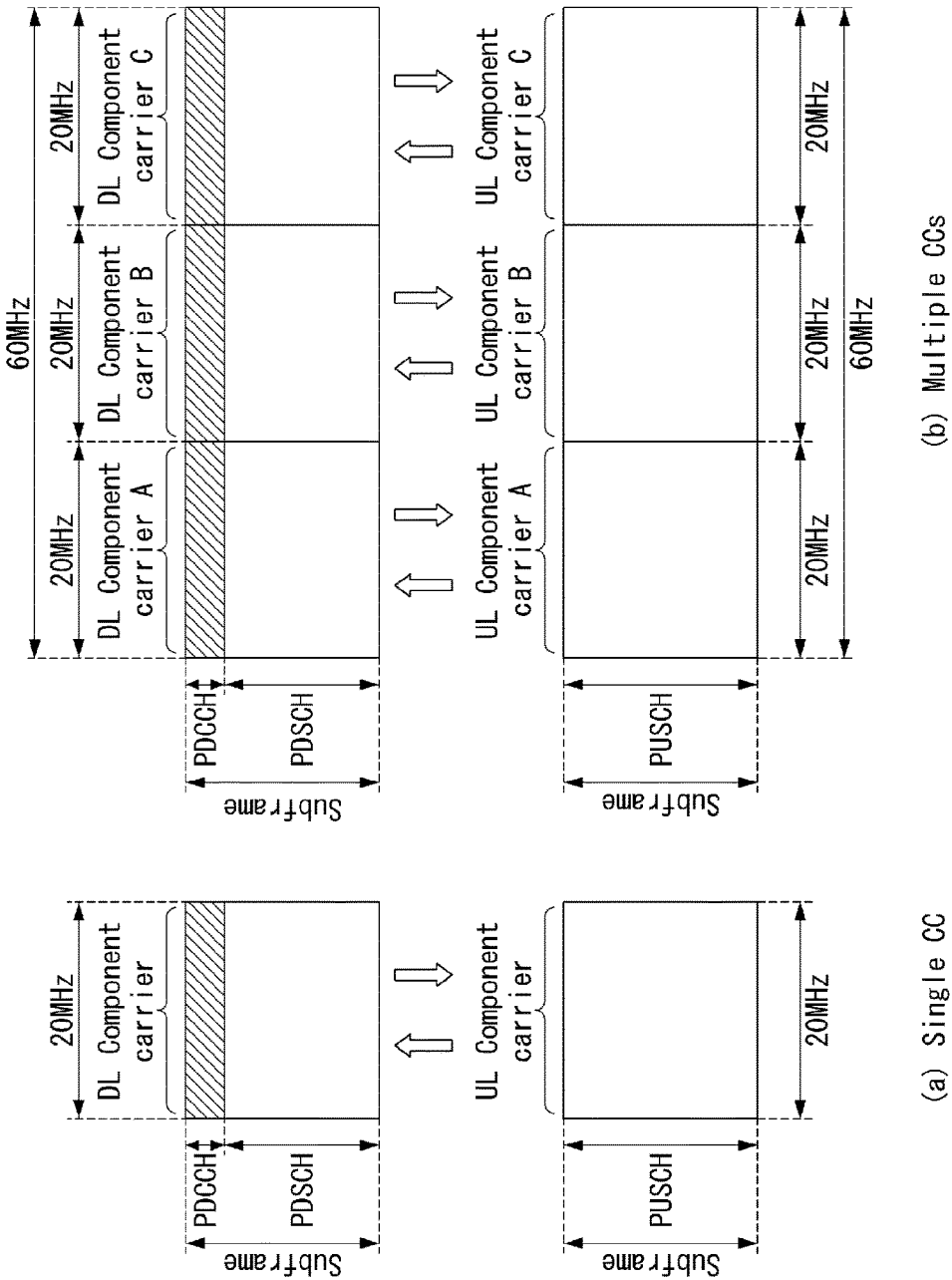

[Figure 13]
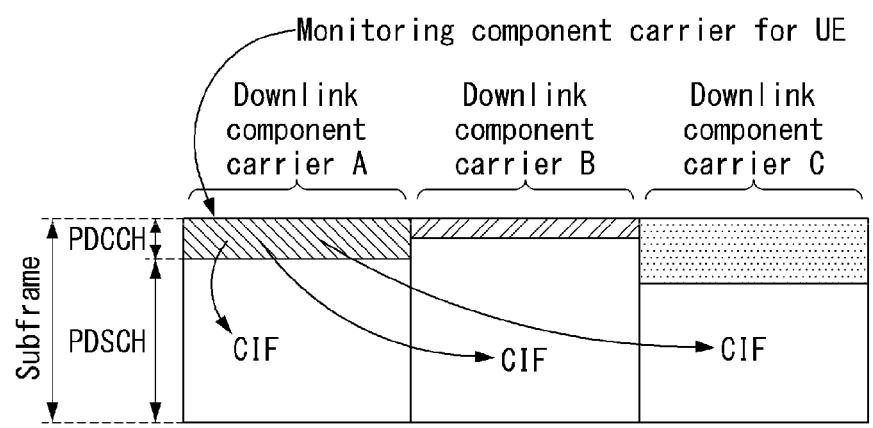

[Figure 14]
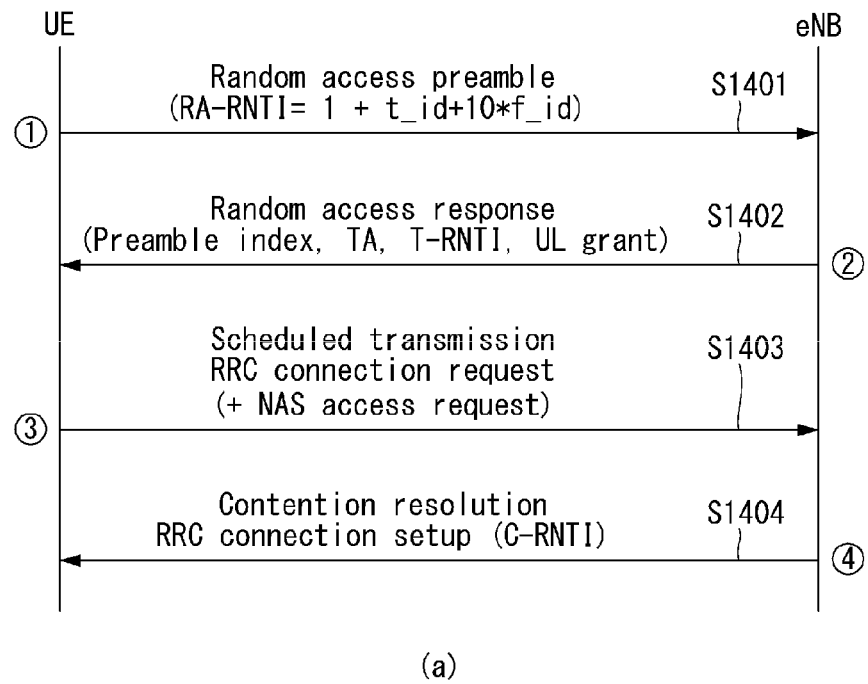
(a)
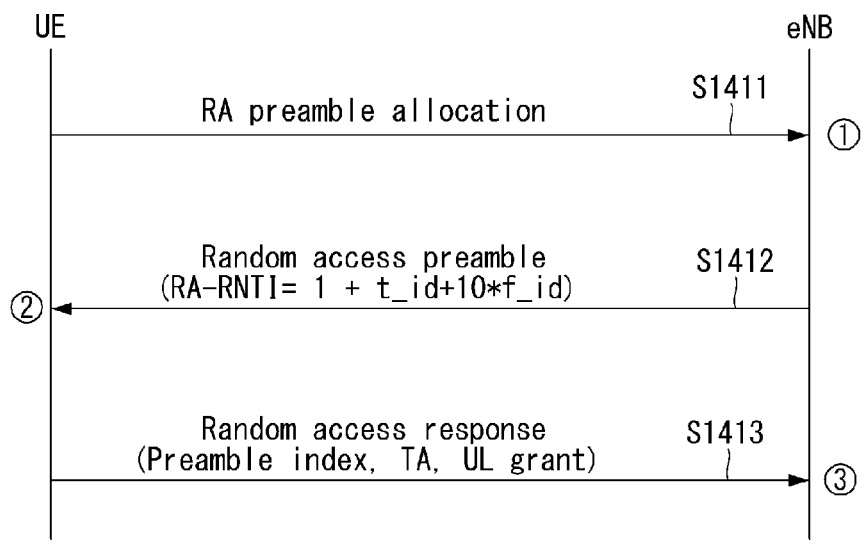
(b)

[Figure 15a]
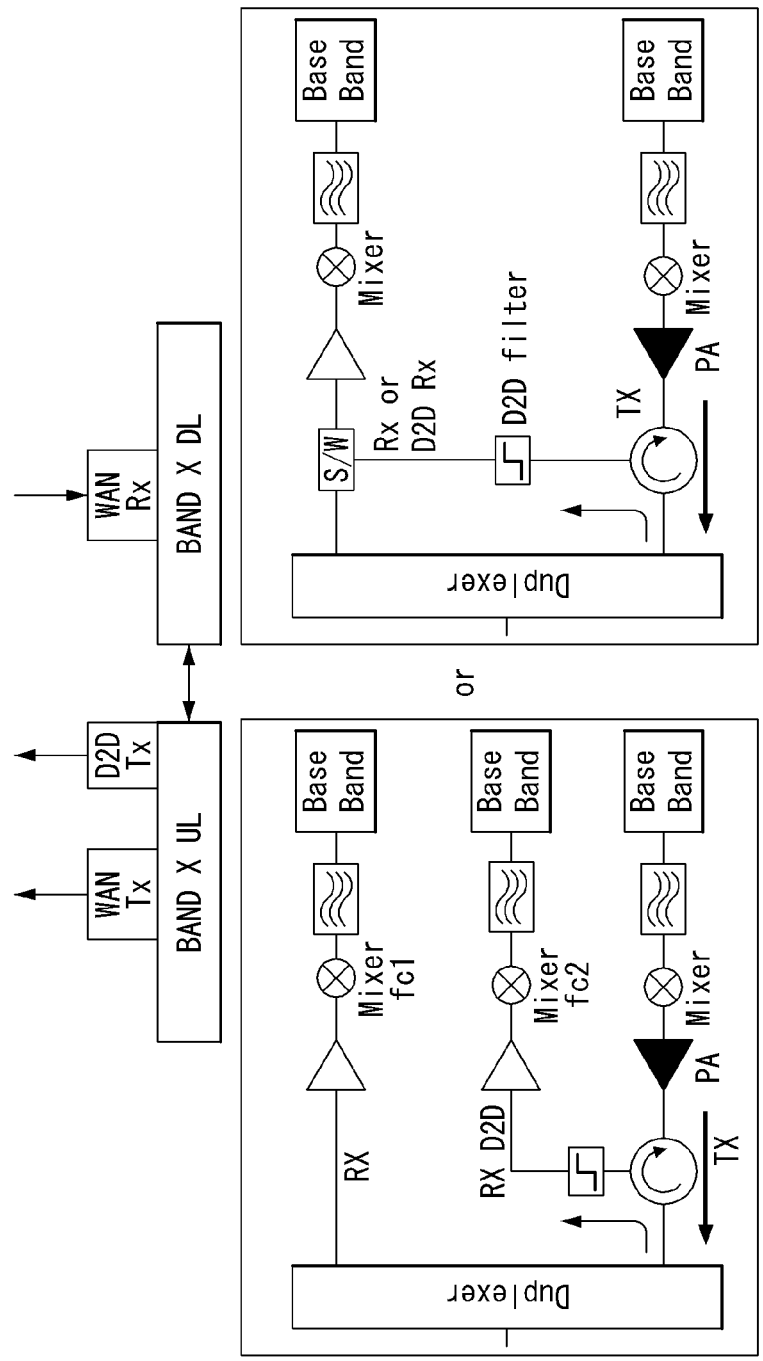

[Figure 15b]
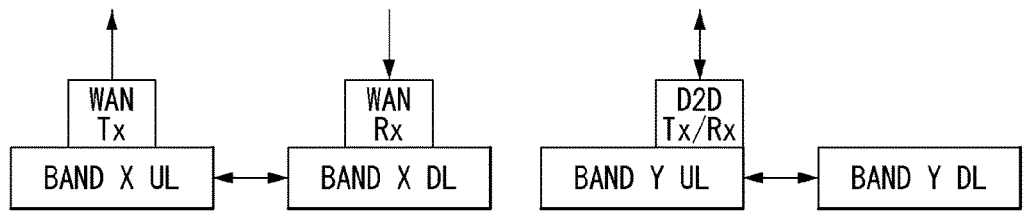
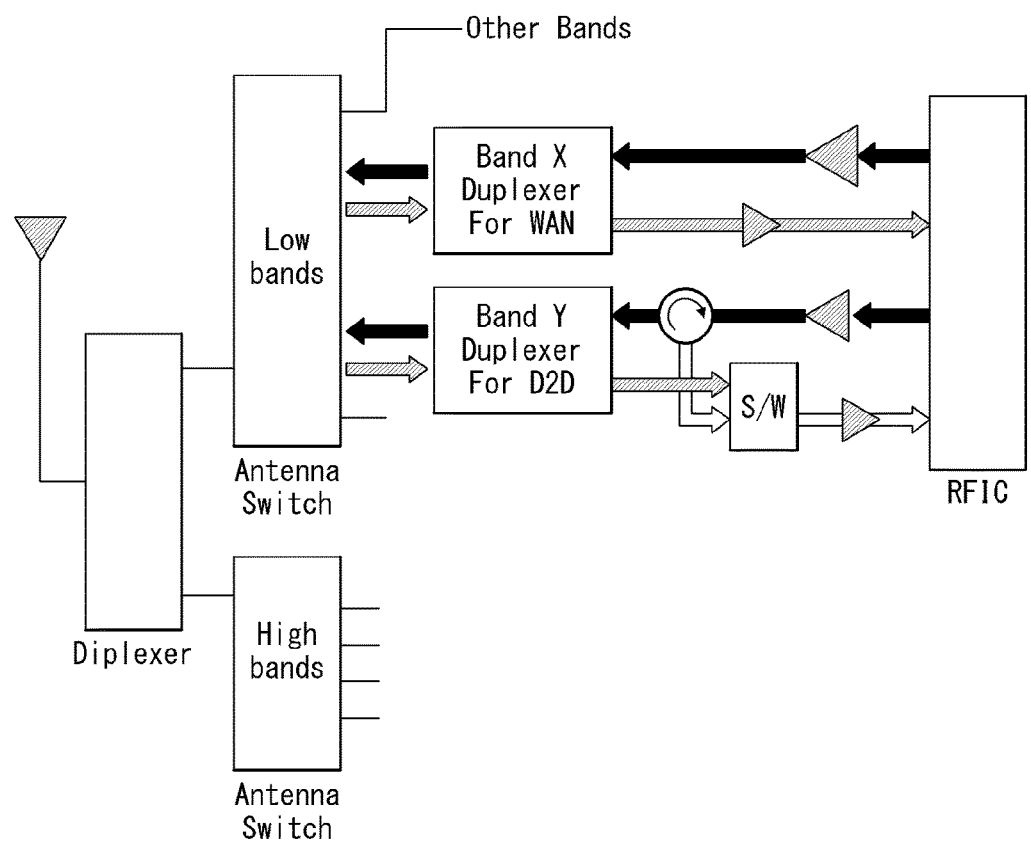

[Figure 16]
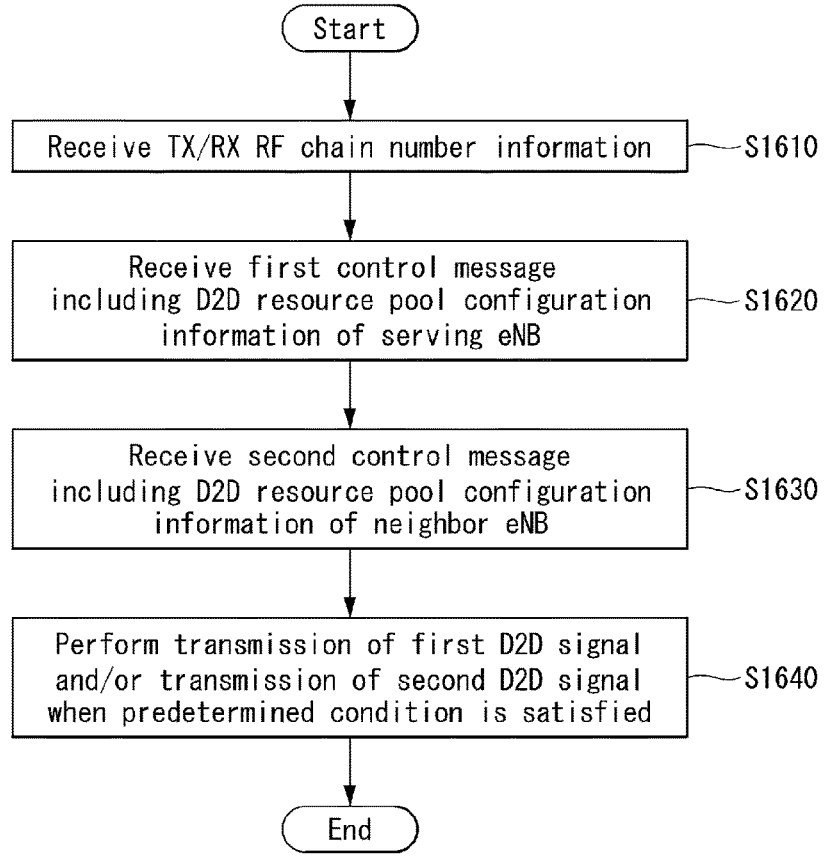
[Figure 17]
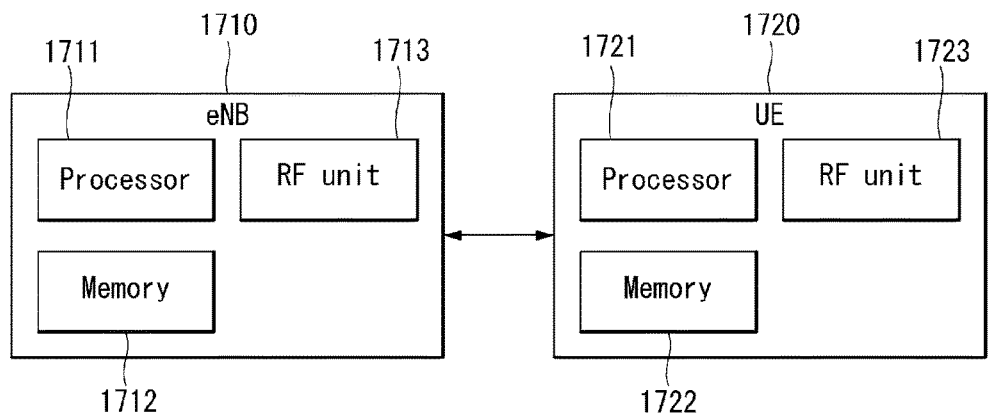

METHOD FOR PERFORMANCE DEVICE-TO-DEVICE COMMUNICATION IN WIRELESS COMMUNICATION SYSTEM AND APPARATUS THEREFOR

CROSS-REFERENCE TO RELATED APPLICATIONS

This application is the National Phase of PCT International Application No. PCT/KR2015/013313, filed on Dec. 7, 2015, which claims priority under 35 U.S.C. 119(e) to U.S. Provisional Application No. 62/097,566, filed on Dec. 29, 2014, all of which are hereby expressly incorporated by reference into the present application.

BACKGROUND OF THE INVENTION

Field of the Invention

The present invention relates to a wireless communication system, and more specifically, to a method for performing device-to-device (D2D) communication and an apparatus supporting the same.

Discussion of the Related Art

Mobile communication systems have been developed in order to provide audio services while securing user mobility. While mobile communication systems extend services to data services in addition to audio services, current explosive traffic increase causes resource shortage and users require faster services. Accordingly, enhanced mobile communication systems are needed.

Future mobile communication systems need to accept explosive data traffic and a considerably increased number of connected devices, remarkably increase throughput per user, have very low end-to-end latency and support high energy efficiency. To this end, various technologies such as dual connectivity, massive MIMO (Massive Multiple Input Multiple Output), in-band full duplex, NOMA (Non-Orthogonal Multiple Access), super wideband and device networking are researched.

SUMMARY OF THE INVENTION

An object of the present description is to provide a method for minimizing latency due to D2D communication interruption by receiving information related to D2D communication of a neighbor cell from a serving cell.

In addition, an object of the present description is to provide a method for performing D2D transmission by a D2D UE having one or more transmission RF chains through TDM.

Furthermore, an object of the present description is to provide a method for setting priority of D2D signal transmission or dropping a D2D signal transmission when D2D resource pools of cells overlap.

The technical problems solved by the present invention are not limited to the above technical problems and other technical problems which are not described herein will become apparent to those skilled in the art from the following description.

A method for performing, by a first UE, device-to-device (D2D) communication in a wireless communication system includes: transmitting, to a first eNB, transmission/reception (TX/RX) chain number information indicating the number of supported TX/RV radio frequency (RF) chains; receiving, from the first eNB, a first control message including D2D resource pool configuration information of the first eNB; receiving, from the first eNB, a second control message including D2D resource pool configuration information of a second eNB; and transmitting a first D2D signal to the first eNB and/or transmitting a second D2D signal to the second eNB using one or more TX RF chains when a predetermined condition is satisfied.

The transmitting of the second D2D signal may include: performing D2D synchronization with the second eNB with reference to downlink timing of the second eNB; and transmitting, to the second eNB, the second D2D signal on the basis of the D2D resource pool configuration information of the second eNB.

The second D2D signal may include a reference signal (RS) generated by a specific scrambling seed value related to the second eNB.

Power control related to the second eNB may be applied to the second D2D signal.

Transmission of the first D2D signal may be performed in a first time period and transmission of the second D2D signal may be performed in a second time period.

Transmission of the first D2D signal and transmission of the second D2D signal may be performed using the same component carrier (CC) or different component carriers.

Transmission of the second D2D signal may be performed using some uplink resources of the second D2D signal when transmission of the first D2D signal and transmission of the second D2D signal are performed using the same component carrier.

Transmission of one of the first D2D signal and second D2D signal may be dropped when a D2D resource pool of the first eNB and a D2D resource pool of the second eNB overlap.

When parts of the a D2D resource pools overlap, transmission of one of the D2D signals may be dropped only in the overlapping resources.

Transmission/reception to/from the first eNB may not be performed in the second time period.

The second control message may further include D2D operation mode information related to transmission of the second D2D signal.

The second control message may be a radio resource control (RRC) connection request message or a handover related message.

The D2D resource pool of the second eNB may be a D2D resource pool specific to the second eNB or a common D2D resource pool commonly used in a plurality of eNBs.

The predetermined condition may correspond to one of a case in which a radio resource management (RRM) measurement result with respect to the second eNB is equal to or greater than a predefined threshold, a case in which the strength of a D2D synchronization signal (D2DSS) received from the second eNB is equal to or greater than a predetermined value and a case in which a command message for ordering handover from the first eNB to a target eNB is received.

The D2D resource pool configuration information of the second eNB may be transmitted from the second eNB to the first eNB through backhaul signaling.

When multiple TX RF chains are used, D2D signals may be transmitted to eNBs using different TX RF chains.

When the eNBs use different D2D resource pools, average TX power scaling may be equally applied to the TX RF chains.

The method may further include: determining TX power of the D2D signals transmitted through the TX RF chains;

and down-scaling the TX power of the D2D signals in the TX RF chains by the same value when the determined TX power exceeds an upper limit of a maximum transmittable power of the UE.

A specific TX RF chain from among the multiple TX RX chains may be used for transmission and reception of a WAN signal and transmission and reception of a D2D signal, and other TX RF chains may be used for transmission and reception of a D2D signal only.

A first UE performing (D2D) communication in a wireless communication system includes: a radio frequency (RF) unit for transmitting and receiving a radio signal; and a processor functionally connected to the RF unit, wherein the processor is configured: to transmit, to a first eNB, transmission/reception (TX/RX) chain number information indicating the number of supported TX/RV radio frequency (RF) chains; to receive, from the first eNB, a first control message including D2D resource pool configuration information of the first eNB; to receive, from the first eNB, a second control message including D2D resource pool configuration information of a second eNB; and to transmit a first D2D signal to the first eNB and/or transmit a second D2D signal to the second eNB using one or more TX RF chains when a predetermined condition is satisfied.

The present description can minimize latency due to D2D communication interruption by receiving information related to D2D communication of a neighbor cell from a serving cell.

In addition, the present description can achieve smooth D2D communication operation by setting priority of D2D signal transmissions or dropping a D2D signal transmission when D2D resource pools of cells overlap.

The effects of the present invention are not limited to the above-described effects and other effects which are not described herein may be derived by those skilled in the art from the following description of the embodiments of the present invention.

BRIEF DESCRIPTION OF THE DRAWINGS

The accompanying drawings, which are included to provide a further understanding of the invention, illustrate embodiments of the invention and together with the description serve to explain the principle of the invention.

FIG. 1 illustrates an example of an E-UTRAN (Evolved Universal Terrestrial Radio Access Network) UMTS network structure to which the present invention is applicable.

FIG. 2 illustrates physical channels used in a 3GPP LTE/LTE-A system to which the present invention is applicable and a general signal transmission method using the same.

FIG. 3 illustrates a radio frame structure in a wireless communication system to which the present invention is applicable.

FIG. 4 illustrates a resource grid for a single downlink slot in a wireless communication system to which the present invention is applicable.

FIG. 5 illustrates a downlink subframe structure in a wireless communication system to which the present invention is applicable.

FIG. 6 illustrates an uplink subframe structure in a wireless communication system to which the present invention is applicable.

FIG. 7 conceptually illustrates D2D communication in a wireless communication system to which the present invention is applicable.

FIG. 8 illustrates examples of various scenarios of D2D communication to which a method proposed in the present description is applicable.

FIG. 9 illustrates a distributed discovery resource allocation scheme in a wireless communication system to which the present invention is applicable.

FIG. 10 illustrates a signaling transmitting/receiving method for D2D communication in a wireless communication system to which the present invention is applicable.

FIG. 11 illustrates a downlink control information transmission method for D2D communication in a wireless communication system to which the present invention is applicable.

FIG. 12 illustrates examples of a component carrier and carrier aggregation in a wireless communication system to which the present invention is applicable.

FIG. 13 illustrates an example of a subframe structure according to cross-carrier scheduling in a wireless communication system to which the present invention is applicable.

FIG. 14 illustrates an example of a random access procedure in an LTE system.

FIG. 15 illustrates an example of an RF structure of a D2D UE to which methods proposed in the present description are applicable.

FIG. 16 is a flowchart illustrating an example of a D2D transmission operation proposed in the present description.

FIG. 17 is a block diagram of a wireless communication apparatus to which methods proposed in the present description are applicable.

DETAILED DESCRIPTION OF THE EMBODIMENTS

Hereafter, preferred embodiments of the present invention will be described in detail with reference to the accompanying drawings. A detailed description to be disclosed hereinbelow together with the accompanying drawing is to describe embodiments of the present invention and not to describe a unique embodiment for carrying out the present invention. The detailed description below includes details in order to provide a complete understanding. However, those skilled in the art know that the present invention can be carried out without the details.

In some cases, in order to prevent a concept of the present invention from being ambiguous, known structures and devices may be omitted or may be illustrated in a block diagram format based on core function of each structure and device.

In the specification, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the present invention and the use of the specific terms may be modified into other forms within the scope without departing from the technical spirit of the present invention.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11(Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present invention may be based on standard documents disclosed in at least one of IEEE 802, 3GPP, and 3GPP2 which are the wireless access systems. That is, steps or parts which are not described to definitely show the technical spirit of the present invention among the embodiments of the present invention may be based on the documents. Further, all terms disclosed in the document may be described by the standard document.

3GPP LTE/LTE-A is primarily described for clear description, but technical features of the present invention are not limited thereto.

General System

FIG. 1 illustrates an example of a structure of E-UTRAN (Evolved Universal Terrestrial Radio Access Network) to which the present invention is applicable.

An E-UTRAN system has evolved from the UTRAN system and may be a 3GPP LTE/LTE-A system, for example. The E-UTRAN includes eNBs that provide a control plane and user plane protocol to UEs and the eNBs are connected through an X2 interface. X2 user plane interface X2-U is defined among eNBs. X2-U provides non-guaranteed delivery of user plane PDU (Packet Data Unit). X2 control plane interface X2-CP is defined between two neighbor eNBs. X2-CP executes functions of delivering context between eNBs, controlling a user plane tunnel between a source eNB and a target eNB, delivering handover related messages, managing uplink load, etc. An eNB is linked to a UE through a radio interface and linked to an EPC (Evolved Packet Core) through S1 interface. S1 user plane interface S1-U is defined between an eNB and an S-GW (Serving Gateway). S1 control plane interface S1-MME is defined between an eNB and an MME (Mobility Management Entity). S1 interface executes an EPS (Evolved Packet System) bearer service management function, NAS (Non-Access Stratum) signaling transport function, network sharing function, MME load balancing function, etc. S1 interface supports many-to-many-relation between an eNB and an MME/S-GW.

FIG. 2 illustrates physical channels used in a 3GPP LTE/LTE-A system to which the present invention is applicable and a signal transmission method using the same.

When powered on or when a UE initially enters a cell, the UE performs initial cell search involving synchronization with an eNB in step S201. For initial cell search, the UE synchronizes with the eNB and acquire information such as a cell Identifier (ID) by receiving a primary synchronization channel (P-SCH) (or primary synchronization signal (PSS)) and a secondary synchronization channel (S-SCH) (or secondary synchronization signal (SSS)) from the eNB.

Then the UE may receive broadcast information from the cell on a physical broadcast channel (PBCH). In the meantime, the UE may check a downlink channel status by receiving a downlink reference signal (DL RS) during initial cell search.

After initial cell search, the UE may acquire more specific system information by receiving a PDCCH and receiving a PDSCH based on information of the PDCCH in step S202.

The UE may perform a random access procedure to access the eNB in steps S203 to S206. For random access, the UE may transmit a preamble to the eNB on a physical random access channel (PRACH) (S203) and receive a response message for the preamble on a PDCCH and a PDSCH corresponding to the PDCCH (S204). In the case of contention-based random access, the UE may perform a contention resolution procedure by further transmitting the PRACH (S205) and receiving a PDCCH and a PDSCH corresponding to the PDCCH (S206).

After the foregoing procedure, the UE may receive a PDCCH/PDSCH (S207) and transmit a physical uplink shared channel (PUSCH)/physical uplink control channel (PUCCH) (S208), as a general downlink/uplink signal transmission procedure.

Control information transmitted from the UE to eNB is called uplink control information (UCI). The UCI may include HARQ-ACK/NACK, a scheduling request (SR), a channel quality indicator (CQI), a precoding matrix indicator (PMI), a rank indicator (RI), etc.

While the UCI is transmitted through a PUCCH in general in the LTE/LTE-A system, the UCI may be transmitted through a PUSCH when control information and traffic data need to be simultaneously transmitted. The UCI may be aperiodically transmitted through a PUSCH at the request/instruction of a network.

FIG. 3 illustrates a radio frame structure in a wireless communication system to which the present invention is applicable.

3GPP LTE/LTE-A supports a type-1 radio frame structure applicable to FDD (Frequency Division Duplex) and a type-2 radio frame structure applicable to TDD (Time Division Duplex).

FIG. 3(*a*) illustrates a type-1 radio frame structure. A radio frame includes 10 subframes each of which includes 2 slots in the time domain. A time for transmitting a subframe is defined as a transmission time interval (TTI). For example, each subframe has a length of 1 ms and each slot has a length of 0.5 ms.

A slot includes a plurality of OFDM symbols in the time domain and includes a plurality of resource blocks (RBs) in the frequency domain. Since downlink uses OFDM in 3GPP LTE, an OFDM symbol represents a symbol period. The OFDM symbol may be called an SC-FDMA symbol or symbol period. An RB as a resource allocation unit may include a plurality of consecutive subcarriers in one slot.

FIG. 3(b) illustrates a type-2 radio frame structure. The type-2 radio frame includes 2 half frames. Each half frame includes 5 subframes, a downlink pilot time slot (DwPTS), a guard period (GP), and an uplink pilot time slot (UpPTS). A single subframe includes two slots. The DwPTS is used for initial cell search, synchronization or channel estimation in a UE. The UpPTS is used for channel estimation in a BS and UL transmission synchronization acquisition in a UE. The GP eliminates UL interference caused by multi-path delay of a DL signal between a UL and a DL.

The radio frame structure is merely exemplary and the number of subframes included in the radio frame, the number of slots included in a subframe, and the number of OFDM symbols included in a slot can be vary.

FIG. 4 illustrates a resource grid of a single downlink slot in a wireless communication system to which the present invention is applicable.

Referring to FIG. 4, a downlink slot includes a plurality of OFDM symbols in the time domain. One downlink slot includes 7 OFDM symbols, and one resource block includes 12 subcarriers in the frequency domain. The number of OFDM symbols and the number of subcarriers are not limited thereto.

Each element on the resource grid is referred to as a resource element (RE). One RB includes 12×7(6) REs. The number $N_{RB}$ of RBs included in the downlink slot depends on a downlink transmit bandwidth. The number of resource blocks, N^DL, included in a downlink slot depends on a downlink transmission bandwidth.

The structure of an uplink slot may be same as that of the downlink slot.

FIG. 5 illustrates a downlink subframe structure in a wireless communication system to which the present invention is applicable.

Referring to FIG. 5, a maximum of 3 OFDM symbols located in a front portion of a first slot within a subframe correspond to a control region to which a control channel is allocated. The remaining OFDM symbols correspond to a data region to which a physical downlink shared chancel (PDSCH) is allocated. Examples of downlink control channels used in 3GPP LTE include a physical control format indicator channel (PCFICH), a physical downlink control channel (PDCCH), a physical hybrid ARQ indicator channel (PHICH), etc.

The PCFICH is transmitted at a first OFDM symbol of a subframe and carries information regarding the number of OFDM symbols (i.e., a control region size) used for transmission of control channels within the subframe. The PHICH is a response of uplink transmission and carries an HARQ acknowledgment (ACK)/negative-acknowledgment (NACK) signal. Control information transmitted through the PDCCH is referred to as downlink control information (DCI). The DCI includes uplink resource allocation information, downlink resource allocation information or an uplink transmit (TX) power control command.

A PDCCH may carry a transport format and a resource allocation of a downlink shared channel (DL-SCH), resource allocation information of an uplink shared channel (UL-SCH) (which is referred to as a UL grant), paging information on a paging channel (PCH), system information on the DL-SCH, information on resource allocation of an upper-layer control message such as a random access response transmitted on the PDSCH, a set of TX power control commands on individual UEs within an arbitrary UE group, a TX power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs.

The eNB determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

FIG. 6 illustrates an uplink subframe structure in a wireless communication system to which the present invention is applicable.

Referring to FIG. 6, an uplink subframe is divided into a control region and a data region in the frequency domain. The control region is allocated a PUCCH which carries uplink control information. The data region is allocated a PUSCH which carries user data.

A resource block (RB) pair is allocated to a PUCCH for one UE within a subframe. The RBs belonging to the RB pair occupy different subcarriers in two slots. The RB pair allocated to the PUCCH is frequency hopped at a slot boundary.

Uplink Power Control

The purpose of power control in a wireless communication system is to compensate for channel path loss and fading to guarantee Signal-to-Noise Ratio (SNR) required for the system and to provide higher system performance through appropriate rank adaptation. Inter-cell interference may also be adjusted by power control.

Uplink power control in the conventional system is based on closed-loop correction and/or open-loop power control. Open-loop power control is performed by calculation of User Equipment (UE) and closed-loop correction is performed by a power control command from an evolved Node B (eNB). A Transmit Power Control (TPC) command from the eNB may be defined in a DCI format of a PDCCH.

A power control procedure is described below with reference to the case of single transmit antenna transmission as an example.

UE generally measures uplink power using a closed-loop scheme and an eNB may adjust uplink power by a closed-loop correction factor A. Power control of an uplink shared channel (PUSCH) may be performed according to the following Equation 12.

$$P_{PUSCH}(i) = \min\{P_{CMAX}, 10\log_{10}(M_{PUSCH}(I)) + P_{O_{PUSCH}}(J) + \alpha(j) \cdot PL + \Delta_{TF} + f(i)\}$$ [Equation 1]

In Equation 1, PPUSCH(i) represents transmission power of an ith subframe of a PUSCH and is in units of dBm.

PCMAX represents maximum allowable power which is set by a higher layer and is determined according to the class of the UE.

MPUSCH(i) represents the amount of allocated resources and may be expressed in units of allocated resource blocks (each being a group of subcarriers, for example, 12 subcarriers). MPUSCH(i) has a value between 1 and 110 and is updated every subframe. In Equation 1, PO_PUSCH(j) includes 2 parts: PO_NOMINAL_PUSCH(j) and PO_UE_PUSCH(j), as shown in the following Equation 2.

$$P_{O_{PUSCH}}(j) = P_{O_{NOMINAL_{PUSCH}}}(j) + P_{O_{UE_{PUSCH}}}(j) \quad \text{[Equation 2]}$$

In Equation 2, PO_NOMINAL_PUSCH(j) is a value which is given cell-specifically by the higher layer and PO_UE_PUSCH(j) is a value which is given UE-specifically by the higher layer.

In Equation 1, argument j may have a value of 0, 1, or 2. When j=0, the argument j corresponds to PUSCH transmission which is scheduled dynamically in a PDCCH. When j=1, the argument j corresponds to semi-persistent PUSCH transmission. When j=2, the argument j corresponds to PUSCH transmission based on a random access grant.

In Equation 1, α(j)·PL is a formula for path loss compensation. Here, PL represents downlink path loss measured by the UE and is defined as "reference signal power-higher layer filtered Reference Signal Received Power (RSRP)".

α(j) is a scaling value representing a path loss correction ratio, has one of the values of {0, 0.4, 0.5, 0.6, 0.7, 0.8, 0.9, 1}, and is expressed by a 3-bit value. When α is 1, this indicates that the path loss has been fully compensated for and, when α is less than 1, this indicates that the path loss has been partially compensated for.

ΔTF(i) in Equation 1 may be given by the following Equation 3.

$$\Delta_{TF}(i) = \begin{cases} 10\log_{10}(2^{MPR \cdot K_S} - 1), K_S = 1.25, \text{deltaMCS} - \text{Enabled} = 1 \\ 0, K_S = 0, \text{deltaMCS} - \text{Enabled} = 0 \end{cases} \quad \text{[Equation 3]}$$

As shown in Equation 3, use of ΔTF(i) may be set by a flag "deltaMCS-Enabled". When the flag deltaMCS-Enabled has a value of 1, ΔTF(i) is set to be used. When the flag deltaMCS-Enabled has a value of 0, ΔTF(i) is not used since ΔTF(i) has a value of 0. MPR in Equation 3 may be given by the following Equation 4.

$$MPR = \frac{TBS}{N_{RE}}, N_{RE} = M_{PUSCH} \cdot N_{SC}^{RB} \cdot N_{symb}^{PUSCH} \quad \text{[Equation 4]}$$

In Equation 4, TBS stands for a transport block size and NRE is the number of Resource Elements (REs) which is expressed as the number of subcarriers. When data is retransmitted, the value of NRE may be acquired from a value indicated by a first PDCCH for the same transport block.

f(i) in Equation 1 represents a parameter for adjusting transmission power according to a closed-loop scheme. A PDCCH of DCI format 0, 3, or 3A may be used to provide f(i). That is, f(i) is a parameter that is given UE-specifically.

In association with f(i), a flag "Accumulation_Enabled" may indicate whether a transmission power value is given through accumulation of the previous transmission power or is given without accumulation of the previous transmission power.

When the flag "Accumulation_Enabled" is set to enable the accumulation mode, f(i) may be given as shown in the following Equation 5.

$$f(i) = f(i-1) + \delta_{PUSCH}(i - K_{PUSCH}) \quad \text{[Equation 5]}$$

In Equation 5, $\delta_{PUSCH}$ is a UE-specific correction value and may be referred to as a Transmit Power Control (TPC) command. $\delta_{PUSCH}$ may be included in a PDCCH of DCI format 0 to be signaled to the UE or may be joint-coded together with other TPC commands into a PDCCH of DCI format 3/3A to be signaled to the UE. An accumulated value of $\delta_{PUSCH}$ dB which is signaled in a PDCCH of DCI format 0 or 3 may have a size of 2 bits as shown in the following Table 1.

TABLE 1

| TPC Command Field in DCI format 0/3 | Accumulated $\delta_{PUSCH}$ |
|---|---|
| 0 | −1 |
| 1 | 0 |
| 2 | 1 |
| 3 | 3 |

When the UE detects PDCCH DCI format 3A, the accumulated value of $\delta_{PUSCH}$ dB is represented by 1 bit and may have one of the values of {−1, 1}.

In Equation 5, $K_{PUSCH}$=4 in the case of FDD.

When both DCI format 0 and DCI format 3/3A are detected in the same subframe, the UE uses $\delta_{PUSCH}$ that is provided by DCI format 0. When a TPC command is absent or in the case of a discontinuous reception (DRX) mode, $\delta_{PUSCH}$=0 dB. When the transmission power of the UE reaches the maximum transmission power, a TPC command having a positive value is not accumulated (i.e., the maximum transmission power is maintained). When the transmission power of the UE reaches the minimum transmission power, a TPC command having a negative value is not accumulated (i.e., the minimum transmission power is maintained).

On the other hand, when the flag "Accumulation_Enabled" is set to disable the accumulation mode, f(i) may be given as shown in the following Equation 6. The disabled accumulation mode means that the uplink power control value is given as an absolute value.

$$f(i) = \delta_{PUSCH}(i - K_{PUSCH}) \quad \text{[Equation 6]}$$

In Equation 6, the value of $\delta_{PUSCH}$ is signaled only when the PDCCH DCI format is 0. At this time, the value of the $\delta_{PUSCH}$ is given as shown in Table 2 below.

TABLE 2

| TPC Command Field in DCI format 0 | Absolute $\delta_{PUSCH}$ (dB) only DCI format 0 |
|---|---|
| 0 | −4 |
| 1 | −1 |
| 2 | 1 |
| 3 | 4 |

In Equation 6, $K_{PUSCH}$=4 in the case of FDD.

f(i)=f(i−1) when a PDCCH is detected, when the current mode is a DRX mode, or when the current subframe is not an uplink subframe in TDD.

Power control for an uplink control channel (PUCCH) may be defined as shown in the following Equation 7.

$$P_{PUCCH}(i)=\min\{P_{CMAX}, P_{O_{PUCCH}}+PL+h(n_{CQI},n_{HARQ})+\Delta_{F_{PUCCH}}(F)+g(i)\} \quad [\text{Equation 7}]$$

In Equation 7, PPUCCH(i) is expressed in units of dBm. In Equation 7, ΔF_PUCCH(F) is provided by the higher layer and each ΔF_PUCCH(F) corresponds to a) PUCCH format (F) associated with PUCCH format 1a.

The value h(nCQI, nHARQ) depends on the PUCCH format, nCQI corresponds to a number information bit for Channel Quality Information (CQI), and nHARQ corresponds to the number of Hybrid Automatic Repeat request (HARQ) bits.

D2D (Device-to-Device) Communication

Device-to-Device (D2D) communication technology refers to direct communication between neighbor UEs without passing through an infrastructure such as an eNB. Technologies using unlicensed frequency bands such as Wi-Fi Direct and Bluetooth have been developed as D2D communication technologies. However, development and standardization of D2D communication technology using licensed frequency bands are under progress for the purpose of improving frequency utilization efficiency of cellular systems.

Although D2D communication refers to machine-to-machine communication in general, D2D communication in the present invention may include communication between various devices having a communication function, such as smartphones and personal computers as well as a simple device having a communication function.

FIG. 7 is a diagram for schematically describing the D2D communication in a wireless communication system to which the present invention may be applied.

FIG. 7a illustrates a communication scheme based on an existing base station eNB, and the UE1 may transmit the data to the base station on the uplink and the base station may transmit the data to the UE2 on the downlink. The communication scheme may be referred to as an indirect communication scheme through the base station. In the indirect communication scheme, a Un link (referred to as a backhole link as a link between base stations or a link between the base station and the repeater) and/or a Uu link (referred to as an access link as a link between the base station and the UE or a link between the repeater and the UE) which are defined in the existing wireless communication system may be related.

FIG. 7b illustrates a UE-to-UE communication scheme as an example of the D2D communication, and the data exchange between the UEs may be performed without passing through the base station. The communication scheme may be referred to as a direct communication scheme between devices. The D2D direct communication scheme has advantages of reducing latency and using smaller wireless resources as compared with the existing indirect communication scheme through the base station.

FIG. 8 illustrates examples of various scenarios of the D2D communication to which the method proposed in the specification may be applied.

The D2D communication scenario may be divided into (1) an out-of-coverage network, (2) a partial-coverage network, and (3) in-coverage network according to whether the UE1 and the UE2 are positioned in coverage/out-of-coverage.

The in-coverage network may be divided into an in-coverage-single-cell and an in-coverage-multi-cell according to the number of cells corresponding to the coverage of the base station.

FIG. 8a illustrates an example of an out-of-coverage network scenario of the D2D communication.

The out-of-coverage network scenario means perform the D2D communication between the D2D UEs without control of the base station.

In FIG. 8a, only the UE1 and the UE2 are present and the UE1 and the UE2 may directly communicate with each other.

FIG. 8b illustrates an example of a partial-coverage network scenario of the D2D communication.

The partial-coverage network scenario means performing the D2D communication between the D2D UE positioned in the network coverage and the D2D UE positioned out of the network coverage.

In FIG. 8b, it may be illustrated that the D2D UE positioned in the network coverage and the D2D UE positioned out of the network coverage communicate with each other.

FIG. 8c illustrates an example of the in-coverage-single-cell and FIG. 8d illustrates an example of the in-coverage-multi-cell scenario.

The in-coverage network scenario means that the D2D UEs perform the D2D communication through the control of the base station in the network coverage.

In FIG. 8c, the UE1 and the UE2 are positioned in the same network coverage (alternatively, cell) under the control of the base station.

In FIG. 8d, the UE1 and the UE2 are positioned in the network coverage, but positioned in different network coverages. In addition, the UE1 and the UE2 performs the D2D communication under the control of the base station managing the network coverage.

Here, the D2D communication will be described in more detail.

The D2D communication may operate in the scenario illustrated in FIG. 8, but generally operate in the network coverage and out of the network coverage. The link used for the D2D communication (direct communication between the UEs) may be referred to as D2D link, directlink, or sidelink, but for the convenience of description, the link is commonly referred to as the sidelink.

The sidelink transmission may operate in uplink spectrum in the case of the FDD and in the uplink (alternatively, downlink) subframe in the case of the TDD. For multiplexing the sidelink transmission and the uplink transmission, time division multiplexing (TDM) may be used.

The sidelink transmission and the uplink transmission do not simultaneously occur. In the uplink subframe used for the uplink transmission and the sidelink subframe which partially or entirely overlaps with UpPTS, the sidelink transmission does not occur. Alternatively, the transmission and the reception of the sidelink do not simultaneously occur.

A structure of a physical resource used in the sidelink transmission may be used equally to the structure of the uplink physical resource. However, the last symbol of the sidelink subframe is constituted by a guard period and not used in the sidelink transmission.

The sidelink subframe may be constituted by extended CP or normal CP.

The D2D communication may be largely divided into discovery, direct communication, and synchronization.

1) Discovery

The D2D discovery may be applied in the network coverage. (including inter-cell and intra-cell). Displacement of synchronous or asynchronous cells may be considered in the inter-cell coverage. The D2D discovery may be used for various commercial purposes such as advertisement, coupon issue, and finding friends to the UE in the near area.

When the UE 1 has a role of the discovery message transmission, the UE 1 transmits the discovery message and the UE 2 receives the discovery message. The transmission and the reception of the UE 1 and the UE 2 may be reversed. The transmission from the UE 1 may be received by one or more UEs such as UE2.

The discovery message may include a single MAC PDU, and here, the single MAC PDU may include a UE ID and an application ID.

A physical sidelink discovery channel (PSDCH) may be defined as the channel transmitting the discovery message. The structure of the PSDCH channel may reuse the PUSCH structure.

A method of allocating resources for the D2D discovery may use two types Type 1 and Type 2.

In Type 1, eNB may allocate resources for transmitting the discovery message by a non-UE specific method.

In detail, a wireless resource pool for discovery transmission and reception constituted by the plurality of subframes is allocated at a predetermined period, and the discovery transmission UE transmits the next discovery message which randomly selects the specific resource in the wireless resource pool.

The periodical discovery resource pool may be allocated for the discovery signal transmission by a semi-static method. Setting information of the discovery resource pool for the discovery transmission includes a discovery period, the number of subframes which may be used for transmission of the discovery signal in the discovery period (that is, the number of subframes constituted by the wireless resource pool).

In the case of the in-coverage UE, the discovery resource pool for the discovery transmission is set by the eNB and may notified to the UE by using RRC signaling (for example, a system information block (SIB)).

The discovery resource pool allocated for the discovery in one discovery period may be multiplexed to TDM and/or FDM as a time-frequency resource block with the same size, and the time-frequency resource block with the same size may be referred to as a 'discovery resource'.

The discovery resource may be used for transmitting the discovery MAC PDU by one UE. The transmission of the MAC PDU transmitted by one UE may be repeated (for example, repeated four times) contiguously or non-contiguously in the discovery period (that is, the wireless resource pool). The UE randomly selects the first discovery resource in the discovery resource set) which may be used for the repeated transmission of the MAC PDU and other discovery resources may be determined in relation with the first discovery resource. For example, a predetermined pattern is preset and according to a position of the first selected discovery resource, the next discovery resource may be determined according to a predetermined pattern. Further, the UE may randomly select each discovery resource in the discovery resource set which may be used for the repeated transmission of the MAC PDU.

In Type 2, the resource for the discovery message transmission is UE-specifically allocated. Type 2 is sub-divided into Type-2A and Type-2B again. Type-2A is a type in which the UE allocates the resource every transmission instance of the discovery message in the discovery period, and the type 2B is a type in which the resource is allocated by a semi-persistent method.

In the case of Type 2B, RRC_CONNECTED UE request allocation of the resource for transmission of the D2D discovery message to the eNB through the RRC signaling. In addition, the eNB may allocate the resource through the RRC signaling. When the UE is transited to a RRC_IDLE state or the eNB withdraws the resource allocation through the RRC signaling, the UE releases the transmission resource allocated last. As such, in the case of the type 2B, the wireless resource is allocated by the RRC signaling and activation/deactivation of the wireless resource allocated by the PDCCH may be determined.

The wireless resource pool for the discovery message reception is set by the eNB and may be notified to the UE by using RRC signaling (for example, a system information block (SIB)).

The discovery message reception UE monitors all of the discovery resource pools of Type 1 and Type 2 for the discovery message reception.

2) Direct Communication

An application area of the D2D direct communication includes in-coverage and out-of-coverage, and edge-of-coverage. The D2D direct communication may be used on the purpose of public safety (PS) and the like.

When the UE 1 has a role of the direct communication data transmission, the UE 1 transmits direct communication data and the UE 2 receives direct communication data. The transmission and the reception of the UE 1 and the UE 2 may be reversed. The direct communication transmission from the UE 1 may be received by one or more UEs such as UE2.

The D2D discovery and the D2D communication are not associated with each other and independently defined. That is, the in groupcast and broadcast direct communication, the D2D discovery is not required. As such, when the D2D discovery and the D2D communication are independently defined, the UEs need to recognize the adjacent UEs. In other words, in the case of the groupcast and broadcast direct communication, it is not required that all of the reception UEs in the group are close to each other.

A physical sidelink shared channel (PSSCH) may be defined as a channel transmitting D2D direct communication data. Further, a physical sidelink control channel (PSCCH) may be defined as a channel transmitting control information (for example, scheduling assignment (SA) for the direct communication data transmission, a transmission format, and the like) for the D2D direct communication. The PSSCH and the PSCCH may reuse the PUSCH structure.

A method of allocating the resource for D2D direct communication may use two modes mode 1 and mode 2.

Mode 1 means a mode of scheduling a resource used for transmitting data or control information for D2D direct communication. Mode 1 is applied to in-coverage.

The eNB sets a resource pool required for D2D direct communication. Here, the resource pool required for D2D direct communication may be divided into a control information pool and a D2D data pool. When the eNB schedules the control information and the D2D data transmission resource in the pool set to the transmission D2D UE by using the PDCCH or the ePDCCH, the transmission D2D UE transmits the control information and the D2D data by using the allocated resource.

The transmission UE requests the transmission resource to the eNB, and the eNB schedules the control information and the resource for transmission of the D2D direct communication data. That is, in the case of mode 1, the transmission UE needs to be in an RRC_CONNECTED state in order to perform the D2D direct communication. The transmission UE transmits the scheduling request to the eNB and a buffer status report (BSR) procedure is performed so that the eNB may determine an amount of resource required by the transmission UE.

The reception UEs monitor the control information pool and may selectively decode the D2D data transmission related with the corresponding control information when decoding the control information related with the reception UEs. The reception UE may not decode the D2D data pool according to the control information decoding result.

Mode 2 means a mode in which the UE arbitrarily selects the specific resource in the resource pool for transmitting the data or the control information for D2D direct communication. In the out-of-coverage and/or the edge-of-coverage, the mode 2 is applied.

In mode 2, the resource pool for transmission of the control information and/or the resource pool for transmission of the D2D direct communication data may be pre-configured or semi-statically set. The UE receives the set resource pool (time and frequency) and selects the resource for the D2D direct communication transmission from the resource pool. That is, the UE may select the resource for the control information transmission from the control information resource pool for transmitting the control information. Further, the UE may select the resource from the data resource pool for the D2D direct communication data transmission.

In D2D broadcast communication, the control information is transmitted by the broadcasting UE. The control information explicitly and/or implicitly indicate the position of the resource for the data reception in associated with the physical channel (that is, the PSSCH) transporting the D2D direct communication data.

3) Synchronization

A D2D synchronization signal (alternatively, a sidelink synchronization signal) may be used so that the UE obtains time-frequency synchronization. Particularly, in the case of the out-of-coverage, since the control of the eNB is impossible, new signal and procedure for synchronization establishment between UEs may be defined.

The UE which periodically transmits the D2D synchronization signal may be referred to as a D2D synchronization source. When the D2D synchronization source is the eNB, the structure of the transmitted D2D synchronization signal may be the same as that of the PSS/SSS. When the D2D synchronization source is not the eNB (for example, the UE or the global navigation satellite system (GNSS)), a structure of the transmitted D2D synchronization signal may be newly defined.

The D2D synchronization signal is periodically transmitted for a period of not less than 40 ms. Each UE may have multiple physical-layer sidelink synchronization identities. The D2D synchronization signal includes a primary D2D synchronization signal (alternatively, a primary sidelink synchronization signal) and a secondary D2D synchronization signal (alternatively, a secondary sidelink synchronization signal).

Before transmitting the D2D synchronization signal, first, the UE may search the D2D synchronization source. In addition, when the D2D synchronization source is searched, the UE may obtain time-frequency synchronization through the D2D synchronization signal received from the searched D2D synchronization source. In addition, the corresponding UE may transmit the D2D synchronization signal.

Hereinafter, for clarity, direct communication between two devices in the D2D communication is exemplified, but the scope of the present invention is not limited thereto, and the same principle described in the present invention may be applied even to the D2D communication between two or more devices.

D2D Discovery

In the following specification, a signal (or message) periodically transmitted by pieces of UE for D2D discovery may be referred to as a discovery message, a discovery signal, or a beacon. This is collectively referred to as a discovery message, for convenience of description.

In dispersive discovery, dedicated resources may be periodically allocated as resources for transmitting and receiving, by UE, a discovery message separately from cellular resources. This is described below with reference to FIG. 9.

FIG. 9 shows a diagram for explaining a distributed discovery resource allocation method in a wireless communication system to which the present invention can be applied.

Referring to FIG. 9, in the dispersive discovery method, a discovery subframe (i.e., a "discovery resource pool") 901 for discovery, of all of cellular uplink frequency-time resources, is allocated fixedly (or dedicatedly), and the remaining region may include an existing LTE uplink Wide Area Network (WAN) subframe region 903. The discovery resource pool may include one or more subframes.

The discovery resource pool may be periodically allocated at a specific time interval (i.e., a "discovery period"). Furthermore, the discovery resource pool may be repeatedly configured within one discovery period.

FIG. 9 shows an example in which a discovery resource pool is allocated in a discovery period of 10 sec and 64 contiguous subframes are allocated to each discovery resource pool. The size of a discovery period and time/frequency resources of a discovery resource pool is not limited thereto.

UE autonomously selects resources (i.e., "discovery resources") for transmitting its own discovery message within a discovery pool dedicatedly allocated thereto and transmits the discovery message through the selected resources.

D2D Direct Communication

The D2D control information may be referred to as Side Link Control Information (SCI) or Scheduling Assignment (SA). As described above, the D2D control information may be transmitted on the PSCCH, and the D2D data may be transmitted on the PSSCH.

Hereinafter, the D2D control information is referred to as SA.

FIG. 10 is a diagram illustrating a signaling transmission/reception method for D2D direct communication in a wireless communication system to which the present invention can be applied.

As illustrated in FIG. 10, an SA (Scheduling Assignment) resource pool 1010 and/or data resource pool 1020 related to D2D communication may be pre-configured, and the pre-configured resource pool may be transmitted from an eNB to D2D UEs through high layer signaling.

The high layer signaling may be RRC signaling.

The phrase "A and/or B", as used herein, may be construed as having the same meaning as at least either A or B (A, B, and A&B).

The SA resource pool and/or data resource pool refers to resources reserved for a UE-to-UE (D2D) link or D2D communication.

The UE-to-UE link may be represented as a sidelink.

Specifically, the SA resource pool refers to a resource region for transmitting an SA, and the data resource pool refers to a resource region for transmitting D2D data.

The SA may be transmitted in an SA period 1030, and the D2D data may be transmitted in a data transmission period 1040.

The SA period and/or the data transmission period may be transmitted from an eNB to D2D UE through a D2D grant.

Alternatively, the SA period may be transmitted through a D2D grant, and the data transmission period may be transmitted through an SA.

The D2D grant represents control information for transmitting an SA (Scheduling Assignment) required for D2D communication from an eNB to D2D UE.

The D2D grant may be represented as a DCI format 5 and transmitted over a physical layer channel, such as PDCCH or EPDCCH, or a MAC layer channel.

The D2D grant may include information related to data transmission as well as information related to SA transmission.

In an example, the SA may include RA (Resource Allocation), MCS, NDI (New Data Indicator), Redundancy Version (RV), etc.

As discussed previously, an SA resource pool for the SA transmission may be transmitted through RRC signaling.

The SA may be transmitted over a PSCCH (Physical Sidelink Control Channel), and the D2D data may be transmitted over a PSSCH (Physical Sidelink Shared Channel).

D2D transmission UE may receive SA information, especially resource allocation (RA) information (hereinafter, "SA RA") for transmitting an SA, from an eNB through a D2D grant.

In this case, the D2D transmission UE may transmit the SA RA information received from the eNB directly to D2D reception UE, or may generate new SA RA information based on the received SA RA information and then transmit the newly generated SA RA information to the D2D reception UE.

Here, if the D2D transmission UE generates a new SA RA, the D2D transmission UE has to perform a SA resource allocation only within a resource region (resource pool) indicated by the D2D grant RA.

That is, this indicates that only some resource region SA RA among the resource regions D2D grant RAs permitted for use by the eNB may be selected for SA transmission.

On the contrary, the D2D transmission UE may use the D2D grant RA allocated by the eNB as it is.

FIG. 11 is a view for explaining a method of transmitting downlink control information for D2D direct communication in a wireless communication system to which the present invention can be applied.

First of all, an SA resource pool and/or D2D data resource pool related to D2D communication is configured by a high layer (S1110).

Afterwards, an eNB transmits the SA resource pool and/or D2D data resource pool to D2D UE through high layer signaling (S1120).

Afterwards, the eNB transmits SA-related control information and/or D2D data-related control information either individually or collectively to D2D transmission UE through a D2D grant (S1130).

The control information may include RA, MCS, NDI, RV, etc.

Afterwards, the D2D transmission UE transmits an SA and/or D2D data to D2D reception UE based on the information received in the step S1130 (S1140).

The SA transmission and the D2D transmission may be performed simultaneously, or the D2D data transmission may be performed after the SA transmission.

Although not shown in FIG. 11, the D2D transmission UE may request transmission resources (i.e., PSSCH resources) for D2D data for the eNB and the eNB may schedule resources for D2D data transmission. To this end, the D2D transmission UE may transmit a scheduling request (SR) to the eNB and then a buffer status report (BSR) procedure may be performed such that the eNB can determine the quantity of resources requested by the D2D transmission UE.

Here, the SR is an SR for requesting allocation of PSSCH resources instead of PUSCH resources and thus can be discriminated from an SR for a PUSCH resource request. Accordingly, a combination of a PUCCH resource index (i.e., a PRB in which the SR is transmitted) and a cyclic shift (CS) applied to a basic sequence (e.g., a ZC sequence) for frequency domain spread of the SR or an orthogonal code (OC) for time domain spread of the SR may be differently set in order to discriminate the SR for a PSCCH from an SR for a PUSCH.

D2D Rx UEs may monitor a control information pool and selectively decode D2D data related to control information related thereto when the information is decoded.

A D2D grant is used to deliver information on resource allocation necessary for SA and data transmission and control information such as an MCS, that is, scheduling information in a D2D TX UE.

Further, since SCI is used for PSSCH scheduling in a D2D TX UE and a D2D Rx UE, a DCI format for the D2D grant proposed in the present invention is used for PSCCH scheduling and may include field information of the SCI.

Although the DCI format for the D2D grant (or sidelink grant) includes both SA and scheduling information for data, as described above, a resource assignment/allocation (RA) field (or information) for SA can be discriminated from an RA field (or information) for data.

For example, the DCI format for the D2D grant may include a frequency hopping flag (FH) field, an RA field for D2D SA, a first RA field for D2D data, a second RA field for D2D SA, a TPC field and zero padding (ZP) bits (if present).

The FH field indicates whether frequency hopping is applied to SA and data transmission. The FH field can be commonly applied to SA transmission and data transmission and thus can be configured as a single field.

For example, a D2D TX UE performs frequency hopping transmission when SA and data transmission is performed when the FH field is "1" and does not perform frequency hopping transmission when SA and data transmission are performed when the FH field is "0".

An SA RA field (or PSCCH RA field or a resource field for a PSCCH) indicates resource information for SA transmission. That is, the SA RA field indicates scheduling information (i.e., resource information) for PSCCH transmission. Accordingly, the D2D TX UE transmits SA (i.e., PSCCH) in a resource indicated by the SA RA field.

Here, the SA RA field may include information (or index) for deriving the position of a time and/or frequency resource region for SA transmission.

For example, the SA RA field can indicate a start point (i.e., index) of resources for SA transmission. In other words, the SA RA field can indicate a start index of subframes and/or resource blocks in which SA is transmitted.

In addition, the D2D TX UE may derive time resources (e.g., subframe indexes) and/or frequency resources (e.g., resource block indexes) for SA transmission using a predetermined function (calculation formula) on the basis of information included in the SA RF field.

Resource allocation information for D2D data transmission may include a D2D data first RA field (or a first PSSCH RA field or a resource block assignment and hopping resource allocation field), and a D2D data second RA field (or a second PSSCH RA field or a time resource pattern field).

The D2D data first RA field indicates resource information (e.g., a resource block) for D2D data transmission in the frequency domain. That is, the D2D data first RA field indicates resource information indicating scheduling information in the frequency domain for PSSCH transmission. Accordingly, the D2D TX UE transmits D2D data (i.e., a PSCCH) in frequency resources indicated by the D2D data first RA field.

For example, the D2D data first RA field can indicate a start point (i.e., start resource block index) of a resource block for D2D data transmission and the length of an allocated resource block using a resource indication value (RIV) as in UL RA.

Further, the D2D data first RA field may indicate a start point (i.e., start resource block index) and an end point (i.e., last resource block index) of a resource block for D2D data transmission by separating the same using an additional field (or information). In this case, an additional bit (e.g., 1 bit) may be needed.

The D2D data second RA field indicates resource information (e.g., a subframe) used for D2D data transmission in the time domain. That is, the D2D data second RA field indicates scheduling information in the time domain for PSSCH transmission. Accordingly, the D2D TX UE transmits D2D data (i.e., a PSSCH) in time resources indicated by the D2D data second RA field.

For example, the D2D data second RA field can indicate a subframe pattern (i.e., a time resource pattern) to be used for D2D data transmission. That is, the D2D data second RA field can include information indicating a time resource pattern used for PSSCH transmission.

Here, the D2D data second RA field can indicate one of a plurality of predetermined time resource patterns. For example, n subframe patterns (represented in a bitmap) such as SF pattern #0 (10001010), SF pattern #1 (00111001), . . . , SF pattern #n (10011001) are predefined, and the D2D data second RA field can indicate one of the n subframe patterns. Here, a value "1" in the bitmap may indicate that D2D data is transmitted in the corresponding subframe and a value "0" may indicate that D2D data is not transmitted in the corresponding subframe, and vice versa.

The TPC field indicates transmit (TX) power for SA and data transmission in the D2D TX UE.

The TPC field may be configured as a single field. When the TPC field is configured as a single field, a TPC field value is commonly applied to TX power for SA transmission and TX power for data transmission.

ZP may be padded with control information, may not be used or may not be present as necessary. That is, ZP may be omitted if not required.

The order of the fields and the number of bits of each field in the aforementioned DCI format are exemplary for convenience of description and may be changed.

In the meantime, the aforementioned DCI format for the D2D grant may not include the MCS field as compared to DCI format 0.

When the eNB signals an MCS value to the D2D TX UE, the MCS field needs to be included in the DCI format for the D2D grant. However, the MCS value may be determined by the D2D TX UE, may be delivered through higher layer signaling (e.g., RRC signaling) or may be predetermined as a fixed value. Accordingly, the D2D grant may not include the MCS field.

Further, the aforementioned DCI format for the D2D grant may not include the NDI field and the RV field. Similarly to the aforementioned MCS value, an NDI value and an RV value may be determined by the D2D TX UE, may be delivered through higher layer signaling (e.g., RRC signaling) or may be predetermined as a fixed value.

General Carrier Aggregation

A communication environment considered in embodiments of the present invention includes multi-carrier supporting environments. That is, a multi-carrier system or a carrier aggregation system used in the present invention means a system that aggregates and uses one or more component carriers (CCs) having a smaller bandwidth smaller than a target band at the time of configuring a target wideband in order to support a wideband.

In the present invention, multi-carriers mean aggregation of (alternatively, carrier aggregation) of carriers and in this case, the aggregation of the carriers means both aggregation between continuous carriers and aggregation between non-contiguous carriers. Further, the number of component carriers aggregated between the downlink and the uplink may be differently set. A case in which the number of downlink component carriers (hereinafter, referred to as 'DL CC') and the number of uplink component carriers (hereinafter, referred to as 'UL CC') are the same as each other is referred to as symmetric aggregation and a case in which the number of downlink component carriers and the number of uplink component carriers are different from each other is referred to as asymmetric aggregation. The carrier aggregation may be used mixedly with a term such as the carrier aggregation, the bandwidth aggregation, spectrum aggregation, or the like.

The carrier aggregation configured by combining two or more component carriers aims at supporting up to a bandwidth of 100 MHz in the LTE-A system. When one or more carriers having the bandwidth than the target band are combined, the bandwidth of the carriers to be combined may be limited to a bandwidth used in the existing system in order to maintain backward compatibility with the existing IMT system. For example, the existing 3GPP LTE system supports bandwidths of 1.4, 3, 5, 10, 15, and 20 MHz and a 3GPP LTE-advanced system (that is, LTE-A) may be configured to support a bandwidth larger than 20 MHz by using on the bandwidth for compatibility with the existing system. Further, the carrier aggregation system used in the preset invention may be configured to support the carrier aggregation by defining a new bandwidth regardless of the bandwidth used in the existing system.

The LTE-A system uses a concept of the cell in order to manage a radio resource.

The carrier aggregation environment may be called a multi-cell environment. The cell is defined as a combination of a pair of a downlink resource (DL CC) and an uplink resource (UL CC), but the uplink resource is not required. Therefore, the cell may be constituted by only the downlink resource or both the downlink resource and the uplink resource. When a specific terminal has only one configured serving cell, the cell may have one DL CC and one UL CC, but when the specific terminal has two or more configured serving cells, the cell has DL CCs as many as the cells and the number of UL CCs may be equal to or smaller than the number of DL CCs.

Alternatively, contrary to this, the DL CC and the UL CC may be configured. That is, when the specific terminal has multiple configured serving cells, a carrier aggregation environment having UL CCs more than DL CCs may also be supported. That is, the carrier aggregation may be appreciated as aggregation of two or more cells having different carrier frequencies (center frequencies). Herein, the described 'cell' needs to be distinguished from a cell as an area covered by the base station which is generally used.

The cell used in the LTE-A system includes a primary cell (PCell) and a secondary cell (SCell). The P cell and the S cell may be used as the serving cell. In a terminal which is in an RRC_CONNECTED state, but does not have the configured carrier aggregation or does not support the carrier aggregation, only one serving constituted by only the P cell is present. On the contrary, in a terminal which is in the RRC_CONNECTED state and has the configured carrier aggregation, one or more serving cells may be present and the P cell and one or more S cells are included in all serving cells.

The serving cell (P cell and S cell) may be configured through an RRC parameter. PhysCellId as a physical layer identifier of the cell has integer values of 0 to 503. SCellIndex as a short identifier used to identify the S cell has integer values of 1 to 7. ServCellIndex as a short identifier used to identify the serving cell (P cell or S cell) has the integer values of 0 to 7. The value of 0 is applied to the P cell and SCellIndex is previously granted for application to the S cell. That is, a cell having a smallest cell ID (alternatively, cell index) in ServCellIndex becomes the P cell.

The P cell means a cell that operates on a primary frequency (alternatively, primary CC). The terminal may be used to perform an initial connection establishment process or a connection re-establishment process and may be designated as a cell indicated during a handover process. Further, the P cell means a cell which becomes the center of control associated communication among serving cells configured in the carrier aggregation environment. That is, the terminal may be allocated with and transmit the PUCCH only in the P cell thereof and use only the P cell to acquire the system information or change a monitoring procedure. An evolved universal terrestrial radio access (E-UTRAN) may change only the P cell for the handover procedure to the terminal supporting the carrier aggregation environment by using an RRC connection reconfiguration message (RRCConnectionReconfiguration) message of an upper layer including mobile control information (mobilityControlInfo).

The S cell means a cell that operates on a secondary frequency (alternatively, secondary CC). Only one P cell may be allocated to a specific terminal and one or more S cells may be allocated to the specific terminal. The S cell may be configured after RRC connection establishment is achieved and used for providing an additional radio resource. The PUCCH is not present in residual cells other than the P cell, that is, the S cells among the serving cells configured in the carrier aggregation environment. The E-UTRAN may provide all system information associated with a related cell which is in an RRC_CONNECTED state through a dedicated signal at the time of adding the S cells to the terminal that supports the carrier aggregation environment. A change of the system information may be controlled by releasing and adding the related S cell and in this case, the RRC connection reconfiguration (RRCConnectionReconfiguration) message of the upper layer may be used. The E-UTRAN may perform having different parameters for each terminal rather than broadcasting in the related S cell.

After an initial security activation process starts, the E-UTRAN adds the S cells to the P cell initially configured during the connection establishment process to configure a network including one or more S cells. In the carrier aggregation environment, the P cell and the S cell may operate as the respective component carriers. In an embodiment described below, the primary component carrier (PCC) may be used as the same meaning as the P cell and the secondary component carrier (SCC) may be used as the same meaning as the S cell.

FIG. 12 illustrates examples of a component carrier and carrier aggregation in the wireless communication system to which the present invention can be applied.

FIG. 12a illustrates a single carrier structure used in an LTE system. The component carrier includes the DL CC and the UL CC. One component carrier may have a frequency range of 20 MHz.

FIG. 12b illustrates a carrier aggregation structure used in the LTE system. In the case of FIG. 12b, a case is illustrated, in which three component carriers having a frequency magnitude of 20 MHz are combined. Each of three DL CCs and three UL CCs is provided, but the number of DL CCs and the number of UL CCs are not limited. In the case of carrier aggregation, the terminal may simultaneously monitor three CCs, and receive downlink signal/data and transmit uplink signal/data.

When N DL CCs are managed in a specific cell, the network may allocate M (M<N) DL CCs to the terminal. In this case, the terminal may monitor only M limited DL CCs and receive the DL signal. Further, the network gives L (L<M<N) DL CCs to allocate a primary DL CC to the terminal and in this case, UE needs to particularly monitor L DL CCs. Such a scheme may be similarly applied even to uplink transmission.

A linkage between a carrier frequency (alternatively, DL CC) of the downlink resource and a carrier frequency (alternatively, UL CC) of the uplink resource may be indicated by an upper-layer message such as the RRC message or the system information. For example, a combination of the DL resource and the UL resource may be configured by a linkage defined by system information block type 2 (SIB2). In detail, the linkage may mean a mapping relationship between the DL CC in which the PDCCH transporting a UL grant and a UL CC using the UL grant and mean a mapping relationship between the DL CC (alternatively, UL CC) in which data for the HARQ is transmitted and the UL CC (alternatively, DL CC) in which the HARQ ACK/NACK signal is transmitted.

Cross Carrier Scheduling

In the carrier aggregation system, in terms of scheduling for the carrier or the serving cell, two types of a self-scheduling method and a cross carrier scheduling method are provided. The cross carrier scheduling may be called cross component carrier scheduling or cross cell scheduling.

The cross carrier scheduling means transmitting the PDCCH (DL grant) and the PDSCH to different respective DL CCs or transmitting the PUSCH transmitted according to the PDCCH (UL grant) transmitted in the DL CC through other UL CC other than a UL CC linked with the DL CC receiving the UL grant.

Whether to perform the cross carrier scheduling may be UE-specifically activated or deactivated and semi-statically known for each terminal through the upper-layer signaling (for example, RRC signaling).

When the cross carrier scheduling is activated, a carrier indicator field (CIF) indicating through which DL/UL CC the PDSCH/PUSCH the PDSCH/PUSCH indicated by the corresponding PDCCH is transmitted is required. For example, the PDCCH may allocate the PDSCH resource or the PUSCH resource to one of multiple component carriers by using the CIF. That is, the CIF is set when the PDSCH or PUSCH resource is allocated to one of DL/UL CCs in which the PDCCH on the DL CC is multiply aggregated. In this case, a DCI format of LTE-A Release-8 may extend according to the CIF. In this case, the set CIF may be fixed to a 3-bit field and the position of the set CIF may be fixed regardless of the size of the DCI format. Further, a PDCCH structure (the same coding and the same CCE based resource mapping) of the LTE-A Release-8 may be reused.

On the contrary, when the PDCCH on the DL CC allocates the PDSCH resource on the same DL CC or allocates the PUSCH resource on a UL CC which is singly linked, the CIF is not set. In this case, the same PDCCH structure (the same coding and the same CCE based resource mapping) and DCI format as the LTE-A Release-8 may be used.

When the cross carrier scheduling is possible, the terminal needs to monitor PDCCHs for a plurality of DCIs in a control region of a monitoring CC according to a transmission mode and/or a bandwidth for each CC. Therefore, a configuration and PDCCH monitoring of a search space which may support monitoring the PDCCHs for the plurality of DCIs are required.

In the carrier aggregation system, a terminal DL CC aggregate represents an aggregate of DL CCs in which the terminal is scheduled to receive the PDSCH and a terminal UL CC aggregate represents an aggregate of UL CCs in which the terminal is scheduled to transmit the PUSCH. Further, a PDCCH monitoring set represents a set of one or more DL CCs that perform the PDCCH monitoring. The PDCCH monitoring set may be the same as the terminal DL CC set or a subset of the terminal DL CC set. The PDCCH monitoring set may include at least any one of DL CCs in the terminal DL CC set. Alternatively, the PDCCH monitoring set may be defined separately regardless of the terminal DL CC set. The DL CCs included in the PDCCH monitoring set may be configured in such a manner that self-scheduling for the linked UL CC is continuously available. The terminal DL CC set, the terminal UL CC set, and the PDCCH monitoring set may be configured UE-specifically, UE group-specifically, or cell-specifically.

When the cross carrier scheduling is deactivated, the deactivation of the cross carrier scheduling means that the PDCCH monitoring set continuously means the terminal DL CC set and in this case, an indication such as separate signaling for the PDCCH monitoring set is not required. However, when the cross carrier scheduling is activated, the PDCCH monitoring set is preferably defined in the terminal DL CC set. That is, the base station transmits the PDCCH through only the PDCCH monitoring set in order to schedule the PDSCH or PUSCH for the terminal.

FIG. 13 illustrates one example of a subframe structure depending on cross carrier scheduling in the wireless communication system to which the present invention can be applied.

Referring to FIG. 13, a case is illustrated, in which three DL CCs are associated with a DL subframe for an LTE-A terminal and DL CC'A' is configured as a PDCCH monitoring DL CC. When the CIF is not used, each DL CC may transmit the PDCCH scheduling the PDSCH thereof without the CIF. On the contrary, when the CIF is used through the upper-layer signaling, only one DL CC 'A' may transmit the PDCCH scheduling the PDSCH thereof or the PDSCH of another CC by using the CIF. In this case, DL CC 'B' and 'C' in which the PDCCH monitoring DL CC is not configured does not transmit the PDCCH.

Random Access Channel (RACH) Procedure

FIG. 14a and FIG. 14b illustrate one example of a random access procedure in the LTE system.

The random access procedure is carried out during initial connection in the RRC_IDLE state, initial connection after radio link failure, handover which requires the random access procedure, and upon occurrence of uplink or downlink data requiring the random access procedure while in the RRC_CONNECTED state. Part of the RRC message such as the RRC connection request message, cell update message, and UTRAN registration area (URA) update message is also transmitted through the random access procedure. Logical channels such as a common control channel (CCCH), dedicated control channel (DCCH), and dedicated traffic channel (DTCH) can be mapped to a physical channel, random access channel (RACH). The RACH is mapped to a physical channel, physical random access channel (PRACH).

If the MAC layer of the UE commands the UE's physical layer to perform PRACH transmission, the UE's physical layer first selects one access slot and one signature and transmits a PRACH preamble through uplink transmission. The random access procedure is divided into a contention-based random access procedure and a non-contention based random access procedure.

FIG. 14a illustrates one example of a contention-based random access procedure, and FIG. 14b illustrates one example of a non-contention based random access procedure.

First, the contention-based random access procedure will be described with reference to FIG. 14a.

The UE receives information about random access from the eNB through system information and stores the received information. Afterwards, in case random access is needed, the UE transmits a random access preamble (which is also called a message 1) to the eNB S1401.

If the eNB receives a random access preamble from the UE, the eNB transmits a random access response message (which is also called a message 2) to the UE S1402. More specifically, downlink scheduling information about the random access response message, being CRC-masked with a random access-ratio network temporary identifier (RA-RNTI), can be transmitted on an L1 or L2 control channel (PDCCH). The UE, which has received a downlink scheduling signal masked with an RA-RNTI, can receive the random access response message from a physical downlink shared channel (PDSCH) and decode the received message. Afterwards, the UE checks the random access response message as to whether random access response information for the UE exists.

The UE can determine existence of random access response information by checking existence of a random access preamble ID (RAID) with respect to the preamble that the UE has transmitted.

The random access response information includes timing alignment (TA) indicating timing offset information for synchronization, radio resource allocation information used for uplink transmission, and a temporary C-RNTI for identifying UEs.

If receiving random access response information, the UE carries out uplink transmission (which is also called a message 3) to an uplink shared channel (UL-SCH) according to radio resource allocation information included in the response information S1403. At this time, uplink transmission may be described as scheduled transmission.

After receiving the uplink transmission from the UE, the eNB transmits a message for contention resolution (which is also called a message 4) to the UE through a downlink shared channel (DL-SCH) S1404.

Next, a non-contention based random access procedure will be described with reference to FIG. 14b.

Before the UE transmits a random access preamble, the eNB allocates a non-contention random access preamble to the UE S1411.

The non-contention random access preamble can be allocated through a handover command or dedicated signaling such as signaling through the PDCCH. In case non-contention random access preamble is allocated to the UE, the UE transmits the allocated non-contention random access preamble to the eNB S1412.

Afterwards, similarly to the S1402 step of the contention-based random access procedure, the UE can transmit a random access response (which is also called a message 2) to the UE S813.

Although the HARQ is not applied for a random access response during the random access procedure described above, the HARQ can be applied for uplink transmission with respect to a random access response or a message for contention resolution. Therefore, the UE doesn't have to transmit ACK or NACK signal for the case of the random access response.

An RF structure of a D2D UE will be briefly described.

FIG. 15 illustrates examples of an RF structure of a D2D UE to which methods proposed in the present description are applicable.

FIG. 15 shows two D2D UE RF structures with respect to D2D-WAN UE capability in an intra-device.

That is, FIG. 15 illustrates examples of D2D UE RF structures based on a D2D-WAN operating frequency.

FIG. 15a shows two candidate UE RF structures for supporting D2D-WAN operation at the same frequency and FIG. 15b shows an example of a UE RF structure for D2D-WAN operation at an inter-band frequency.

D2D-WAN UE operation capability can depend on a scenario in which different types of communication networks coexist in an intra-device in the same operating frequency band.

Intra-frequency D2D-WAN operation may be a worst scenario due to a minimum frequency band gap. Accordingly, analysis as shown in the following table 3 may be needed.

Table 3 shows an example of D2D-WAN operation capability in coexistence scenarios.

Methods proposed in the present description consider an environment in which a UE performs direct communication with another UE using a radio channel, as shown in FIG. 7. Communication in this manner may be called device-to-device (D2D) communication or sidelink.

Further, "V2X (Vehicle to Everything)" using LTE D2D has recently been developed. V2X includes communication between a vehicle and everything such as vehicle to vehicle (V2V), vehicle to infrastructure (V2I) and vehicle to pedestrian (V2P).

D2D communication can be considered to include V2X communication.

While a UE generally refers to a user terminal in D2D communication, a network device such as an eNB may be regarded as a UE when the network device transmits and receives signals according to communication between UEs (i.e., D2D communication).

A device performing D2D communication is regarded as a (D2D) device in the following description for convenience.

First, for D2D communication, that is, for correct transmission and reception of a D2D signal, a UE participating in D2D communication needs to synchronize with an eNB or another UE in terms of time and frequency.

As described above, a (D2D) UE performs synchronization in the following order in the conventional D2D operation.

First, when the UE is located in the coverage of the eNB, the UE synchronizes with the eNB.

Accordingly, the UE synchronizes with another UE synchronized with the same eNB and thus can transmit/receive a D2D signal to/from the other UE.

Second, a UE synchronized with a specific eNB can transmit a D2D synchronization signal (D2DSS) on the basis of synchronization with the eNB.

Hereinafter, a UE that transmits a D2DSS will be referred to as "D2DSS transmission UE" and a UE that receives or detects a D2DSS will be referred to as "D2DSS reception UE".

TABLE 3

| Scenario | Aggressor | Victim | LTE Duplex | Comments |
| --- | --- | --- | --- | --- |
| 1 | D2D TX | LTE UE RX | TDD and FDD | Normal operation, may be some impact in narrow band TX/RX separation |
| 2 | D2D TX | LTE UE TX | TDD and FDD | Possible to simultaneous D2D TX and LTE TX, the operation is similar to intra-NC CA transmission, Need to consider power imbalance. The D2D signal can be under the interference by high TX WAN power. Need to guard gap or A-MPR to protect D2D signal |
| 3 | LTE UE RX | D2D RX | TDD and FDD | No critical impact to D2D RX from LTE NW TX. Need SC-FDMA decoding chain in uplink spectrum. |
| 4 | LTE UE TX | D2D RX | TDD and FDD | Impossible to simultaneous D2D Rx and LTE TX, D2D REFSENS is quite impacted by LTE TX. But may possible in inter-frequency with appropriate Gap btw. D2D RX and WAN TX |

The D2DSS refers to a D2D signal transmitted by a specific UE for synchronization with another UE, and the other UE can acquire synchronization with the UE that has transmitted the D2DSS by detecting the D2DSS.

Particularly, when the D2DSS transmission UE is located outside the coverage of the eNB synchronized therewith (when the D2DSS transmission UE is linked to another eNB or is not linked to any eNB), the other UE (D2DSS reception UE) can perform synchronization through the second method.

Third, a UE located outside the coverage of an eNB can transmit the D2DSS such that another UE can synchronize therewith.

Here, the type of the D2DSS can be determined in advance depending on whether the D21DSS transmission UE is located outside or inside of eNB coverage such that a UE that detects the D2DSS (D2DSS reception UE) can recognize whether the D2DSS is transmitted from a UE inside the coverage of the eNB or a UE outside of the coverage of the eNB.

That is, the conventional D2D synchronization scheme gives priority to synchronization provided by a network (e.g., an eNB) as described above.

More specifically, in determination of D2D transmission synchronization of a (D2D) UE, the (D2D) UE preferentially selects a synchronization signal directly transmitted from an eNB and, when the UE is located outside of the coverage of the eNB, preferentially synchronizes with a D2DSS transmitted from a UE located inside of the coverage of the eNB.

That is, according to the conventional D2D synchronization scheme, a UE synchronizes with timing provided by a network and D2D operation (or communication) is smoothly multiplexed with conventional network operation (transmission/reception operation between an eNB and a UE).

For example, a UE performs conventional network operation (WAN operation: UE-eNB) in a subframe and performs D2D operation (UE-UE) in the next subframe.

In methods proposed in the present description, the aforementioned network timing based D2D synchronization scheme is preferentially considered unless mentioned otherwise.

When handover (HO) occurs because a UE A synchronized with a cell A moves away from the (serving) cell A, D2D communication of the UE A may be interrupted until new timing synchronization acquisition from a target cell B of the UE A is completed.

As a result, latency is generated in D2D communication.

The present description provides methods for minimizing latency that may be generated due to D2D communication interruption.

An unsynchronized environment in which a cell A is not synchronized with a cell B is assumed unless mentioned otherwise. The cell A may be an eNB A and the cell B may be an eNB B.

That is, methods for minimizing latency that may be generated due to D2D communication interruption caused by HO or the like even in an unsynchronized environment will be described in detail.

It is obvious to apply the methods proposed in the present description to environments in which synchronization between cells is acquired (to some extent).

Methods for minimizing latency that may be generated due to D2D communication interruption proposed in the present description will be described with respect to (1) case of a D2D UE having a single TX RF chain (method 1) and (2) case of a D2D UE having multiple TX RF chains (method 2).

That is, the methods can be divided into method 1 and method 2 depending on how many TX/RX RF chains are included in the D2D UE.

<Method 1>

D2D UE with Single TX Chain

First, a situation in which a (D2D) UE A having a single TX RF chain is linked to a serving cell A, which is the simplest implementation form, is assumed.

It is assumed that the serving cell A sets (uses) UL/DL CC (Component Carrier) #0 for WAN transmission/reception and additionally sets some resources of UL CC #0 for D2D transmission/reception.

If the UE A moves away from the cell A and a predetermined condition is satisfied, the UE A may be defined/set to conform to at least one of operations in the following methods to perform D2D TX to a neighbor cell B as well as the cell A without performing handover to the neighbor cell B (or even before handover is completed).

The predetermined condition may be (1) a condition wherein an RRM measurement (e.g., RSRP, RSRQ or the like) result with respect to the neighbor cell B is equal to or greater than a predefined specific threshold X (dB), (2) a condition that a neighbor cell D2DSS strength (e.g., sidelink (S)-RSRP)) is equal to or higher than a predetermined level or (3) a condition that the cell B becomes a HO target and thus the eNB transmits a command corresponding to HO to the UE A.

1. When the predetermined condition (condition (1), (2) or (3)) is satisfied and/or specific higher-layer signaling (e.g., by RRC) or dynamic signaling (e.g., by DCI) is provided by the eNB, D2D communication according to TDM is applicable to the UE A such that a first time period in which D2D TX to the cell A is performed and a second time period in which D2D TX to the cell B is performed are set (or signaled) to the UE A and the UE A performs D2D TX to the cell A or the cell B in the time periods.

The specific higher-layer signaling or dynamic signaling may be collectively referred to as control signaling.

Representation of "A and/or B" used in the specification can be interpreted as "at least one of A and B".

1-1. "Execution of D2D TX to the cell B" may mean at least one of the following operations ① to ④. Operations ① to ④ are valid for methods proposed in the present description unless mentioned otherwise.

The UE A transmits a D2D signal with reference to timing of the cell B. Typically, the UE A can reference downlink timing of the cell B.

The UE A transmits the D2D signal using a D2D resource pool of the cell B. The D2D resource pool may be indicated to the UE A in the form of "D2D resource pool of the cell B" (i.e., the D2D resource pool is specific to a neighbor cell) or may be a specific D2D resource pool for which timing reference is changed to the cell B (i.e., the D2D reference pool is not specific to a specific neighbor cell). In the latter case, the D2D resource pool may be predefined as a specific D2D resource pool used near an HO area.

The UE A transmits the D2D signal including a reference signal (RS) (e.g., DMRS) generated by a specific scrambling seed value related to the cell B.

The UE A performs transmission by applying specific power control associated with the cell B thereto. The specific power control may be a power control process separated from power control to which the UE A conforms. For example, open-loop power control (OLPC) can be applied on the basis of average receive power of a specific RS (e.g., CRS) transmitted by the cell B. Alternatively, specific closed-loop power control (e.g., TPC command) or specific bit indication indicating whether OLPC is applied may be ordered (or applied) separately from the cell A.

1-2. The control signaling (higher-layer signaling or dynamic signaling) is received from the (serving) cell A and the cell A provides information necessary for the UE A to perform D2D TX to the cell B.

Examples of the necessary information may include a D2D operation mode (D2D communication mode/D2D discovery mode) when the UE A performs D2D TX to the cell B (e.g., Mode-2 communication and/or Type-1 discovery), information on frequency/time resources in which D2D TX can be performed (e.g., 2D resource pool configuration) and the like.

Further, when information on a time period in which D2D TX to the cell B can be performed is provided, the UE A can perform D2D TX to the cell B only in the time period in which D2D TX is permitted and recognize time periods other than the time period in which D2D TX is permitted as periods in which D2D TX to the cell A is performed.

Here, the information on the time period in which D2D TX to the cell B can be performed may be period information represented in a specific absolute time unit (depending on cell A timing) or a specific time-domain bitmap such as a subframe bitmap (depending on cell A timing).

In addition, the information on the time period may have a periodic form.

Here, details described in 1-1 (operations $\overline{1}$ to $\overline{4}$) are applicable to "execution of D2D TX to the cell B".

Particularly, in the case of a D2D resource pool specific to the cell B with respect to ② of 1-1, timing information may also have a form of a subframe bitmap depending on cell B timing.

When cells have been synchronized, the cells may share a D2D resource pool and information about the specific D2D resource pool shared by the cells may be set for a UE.

Furthermore, a specific reference cell described as the cell B may be signaled such that the UE recognizes timing reference of the cell B and thus the UE can perform D2D TX based thereon.

1-3. D2D TX to the cell B by the UE A may be restricted by defining a D2D operation mode (e.g., Mode-2 communication and/or Type-1 discovery) in advance such that the UE A can perform only transmission in the defined D2D operation mode.

This is because D2D transmission/reception latency can increase due to backhaul delay between the cell A and the cell B when the cell A receives a dynamic indication such as a scheduling assignment (SA) and a D2D data grant in Mode-1 communication from the cell B through backhaul signaling and transmits the same to the UE A when the cell A is linked to the cell B through a non-ideal backhaul.

Accordingly, when a D2D communication mode in which the UE A performs transmission to the cell B is limited to Mode-2 communication, the cell A previously receives, from the cell B, a D2D resource pool configuration used in the cell B through backhaul signaling (e.g., X2-signaling) and notifies the UE A of the D2D resource pool configuration. Then, the UE A can select D2D transmission resources through random resource selection according to Mode-2 communication in a period in which D2D TX to the cell B can be performed and perform D2D transmission using the D2D transmission resources, reducing latency.

1-4. When the cell A and the cell B use the same CC #0 for D2D transmission and reception and the cell B uses CC #1 different from the CC of the cell A for D2D transmission and reception, the UE A can perform D2D transmission according to TDM defined in 1 using a single TX (RF) chain while switching frequencies.

Particularly, when the neighbor cell A and cell B use different component carriers (CCs) for D2D transmission and reception, interference that may be generated when inter-cell synchronization is not acquired can be effectively controlled.

For example, when a UE of the cell A performs D2D transmission at the timing of the cell B, an eNB of the cell A, which does not correctly recognize synchronization of the cell B, may not correctly detect a position at which D2D transmission occurs and thus may have difficulty in taking an appropriate measure.

Here, if D2D transmission in accordance with the timing of the cell B is set in advance such that the D2D transmission is performed through CC #1, the eNB of the cell A can recognize that at least D2D transmission through CC #0 and an existing UL signal are free of interference due to unsynchronized D2D TX.

To this end, CC information (e.g., band information, band combination information, etc.) to be used for D2D communication may be defined in advance such that cells share the CC information through backhaul signaling (e.g., X2-signaling).

In this manner, a CC to be used for D2D communication may vary with time from the viewpoint of a specific cell.

For example, to intentionally obtain an interference avoidance effect as mentioned above, a CC to be used for D2D communication can be changed in a specific time pattern per cell, the CC change can be signaled to cells through backhaul signaling and readjusted as necessary. In this manner, inter-cell negotiation can be supported.

Since individual UEs have different sets of neighbor cells, it is necessary to support CC switching and inter-cell information exchange and negotiation at a semi-static/long-term level rather than allocating a fixed CC for D2D communication.

In another embodiment, D2D resource pools of the cell A and the cell B may be configured to (partially) overlap irrespective of whether component carriers are identical or different for more flexible resource utilization.

In this case, when D2D resource pools overlap between cells, a priority rule for a specific D2D resource pool can be defined/set.

For example, transmission conforming to the timing of the cell B can be prohibited in a resource region that overlaps with the D2D resource pool of the cell A.

In this case, priority and UE operation can be defined/set such that a UE selects a specific resource from the D2D resource pool of the cell B other than the overlap region and performs transmission in the selected resource according to the timing of the cell B.

Alternatively, when D2D resource pools overlap between cells, the D2D resource pool of the cell B may be given priority.

This can be applied when UE operation in the D2D resource pool of the cell B is considered more important than in the D2D resource pool of the cell A with which D2D communication is currently performed.

Such D2D resource pool priority may be set for a UE in a network configurable form.

1-5. Control signaling for the aforementioned operation of 1 may be included in a handover related message and transmitted to a UE.

For example, when a source cell delivers a D2D resource pool of a target cell to a UE during HO, the UE can change timing reference and immediately transmit a D2D signal to the cell B before HO is finished (e.g., before a PRACH preamble is transmitted) and thus latency with respect to D2D transmission can be reduced.

In another embodiment, when the cell B transmits a random access response (RAR) to the UE in response to a PRACH preamble (step 2) after step 1 in which the UE transmits the PRACH preamble to the cell B according to a handover procedure, the cell B can additionally notify the UE of control information (e.g., D2D resource pool configuration information based on Mode-2 communication) which is being used thereby and is necessary for D2D communication.

The control information necessary for D2D communication may be transmitted from the cell B to the UE only when information representing that a specific D2D UE will perform a handover procedure is exchanged through backhaul signaling between the cell A and the cell B.

That is, in a case other than the aforementioned situation, transmission of the control information to the UE may generate unnecessary signaling overhead.

In another embodiment, step 1 (PRACH preamble reception) and step 2 (RAR transmission) are the same as the conventional procedure, and the UE may notify the cell B that the UE has performed D2D communication (through the cell A) in step 3 (L2/L3 message transmission by the UE).

Here, D2D communication related information delivered from the UE to the cell B through the message of step 3 may be configured in various forms.

The D2D communication related information may or may not be included in the message of step 3 depending on the quantity or size thereof.

That is, the D2D communication related information (or parameter) can be transmitted through a message (different RRC signaling, DCI, SIB or the like) other than the message of step 3.

For example, the UE can report, to the cell B, all or some parameters/configuration information (e.g., D2D operation mode and/or discovery type information) related to D2D communication that has been performed through the cell A.

Alternatively, a specific identifier is assigned to the UE when information representing that the UE will be handed over is previously exchanged through backhaul signaling between the cell A and the cell B, and the UE can report the specific identifier thereof to the cell B when the message corresponding to step 3 is transmitted to the cell B in a state that the UE previously receives information on the specific identifier from the cell A or knows the information.

The specific identifier may be a C-RNTI of the UE in the cell A, an additional temporary identifier or unique identification information of the UE.

Subsequently, the cell B can additionally notify the UE of control information (e.g., D2D resource pool configuration information based on Mode-2 communication) which is being used thereby and is necessary for D2D communication when step 4 (contention resolution message transmission from the cell B to the UE) is performed.

In this manner, the UE can resume D2D TX operation immediately after message reception corresponding to step 2 or message reception corresponding to step 4, instead of finishing HO to the cell B, receiving the control information for D2D communication from the cell B and then resuming D2D TX, thereby reducing latency.

1-6. For the aforementioned operations, the UE may previously notify an eNB of TX/RX chain information indicating the number of TX/RX RF chains thereof through a specific capability signaling transmission/reception (or exchange) procedure.

If the UE transmits information indicating that the UE uses a single TX/RX RF chain to a cell (or eNB) through capability signaling, the cell (or eNB) can provide control signaling for the TDM operation when the UE performs D2D operation according to the aforementioned procedures such that D2D communication operation according to TDM is applied.

Alternatively, the UE may (directly) notify, through capability signaling, the cell (or eNB) of information related to whether the TDM related operation is configurable or whether configuration of the TDM related operation is preferred, instead of directly signaling UE implementation related information such as the number of TX/RX (RF) chains thereof to the cell (or eNB).

1-7. In the operations of the aforementioned methods (1.1 to 1.6), when the cell A and the cell B are unsynchronized, timing at which the UE performs D2D TX to the cell A may differ from timing at which the UE performs D2D TX to the cell B.

That is, in the aforementioned methods of 1 (1.1 to 1.7), a UE having a single TX/RX chain performs D2D communication with neighbor cells (or TPs) according to TDM between timings of the neighbor cells (or TPs) while the neighbor cells (or TPs) use different carriers for D2D communication.

1-8. In the aforementioned TDM operation of the UE relative to D2D communication, the UE (at least a single TX chain UE) may not perform WAN TX to the cell A in a period in which timing reference change occurs.

Accordingly, an exception rule for definition of "WAN is prioritized" needs to be newly defined/set.

For example, in a time period to which the new operation of the UE, which is called "execution of D2D TX to the cell B", is set/applied, WAN transmission is not prioritized exceptionally and WAN transmission is deprioritized such that "execution of D2D TX to the cell B" can be prioritized.

In this case, the UE drops WAN transmission in the period in which timing reference change occurs.

That is, the UE performs WAN TX to the cell A only when D2D TX to the cell B is not performed.

Accordingly, the network (e.g., cell or eNB) can deliver an important UL grant and the like to the UE in a time period other than the corresponding time period (in which D2D TX takes precedence over WAN TX) in consideration of the aforementioned UE operation.

Alternatively, an operation of excluding UL grant and scheduling for the UE in the time period in which D2D TX takes precedence over WAN TX is applicable because the network may not predict D2D TX operation of the UE.

A description will be given of a method for minimizing latency that may be caused by D2D communication interruption in a D2D UE having a plurality of TX RF chains, proposed in the present description.

<Method 2>

D2D UE with Multiple TX RF Chains

A situation in which a (D2D) UE A having multiple TX (RF) chains is linked to the (serving) cell A is considered.

Although a case in which the UE A has two TX chains will be described for convenience of description, the following description can be extended and applied to a case in which the UE A has three or more TX chains.

Similar to the aforementioned case of a single TX chain, a situation in which the cell A sets UL/DL CC #0 for WAN TX and additionally sets some resources of UL CC #0 for D2D TX will be described as an example.

If the UE A moves away from the cell A and a predetermined condition is satisfied, the UE A may be defined/set to conform to at least one of operations in the following methods to perform D2D TX to a neighbor cell B as well as the cell A without performing handover to the neighbor cell B (or even before handover is completed).

The predetermined condition may be (1) a condition that an RRM measurement (e.g., RSRP, RSRQ or the like) result with respect to the neighbor cell B is equal to or greater than a predefined specific threshold X (dB), (2) a condition that a neighbor cell D2DSS strength (e.g., sidelink(S)-RSRP)) is equal to or higher than a predetermined level or (3) a condition that the cell B becomes a HO target and thus the eNB transmits a command corresponding to HO to the UE A.

Execution of D2D TX According to TDM

1. When the predetermined condition (condition (1), (2) or (3)) is satisfied and/or specific higher-layer signaling (e.g., by RRC) or dynamic signaling (e.g., by DCI) is provided by the eNB, D2D communication according to TDM is applicable to the UE A such that a first time period in which D2D TX to the cell A is performed and a second time period in which D2D TX to the cell B is performed are set (or signaled) to the UE A and the UE A performs D2D TX to the cell A or the cell B in the time periods.

That is, the details of 1.1 to 1.8 of method 1 can be applied to method 2 (in which the UE A has multiple TX chains) effectively (or by being modified in a similar form) with respect to the TDM scheme defined to perform D2D TX.

In other words, it is desirable to apply D2D TX according to the TDM scheme to a UE having multiple TX chains in various situations such as a case in which the fact that the UE prefers D2D TX according to the TDM scheme even if the UE has multiple TX chains or the fact that D2D TX operation according to the TDM scheme is more suitable for implementation of the UE than simultaneous execution of D2D TX to the cell A and cell B through the multiple TX chains of the UE in terms of D2D TX is reported to a cell (or eNB) through capability signaling.

Simultaneous Execution of D2D TX Through Multiple TX Chains

2. When the predetermined condition (condition (1), (2) or (3)) is satisfied and/or specific higher-layer signaling (e.g., by RRC) or dynamic signaling (e.g., by DCI) is provided by an eNB, the UE performs D2D TX to the cell B as well as the cell A.

Here, the UE can simultaneously perform D2D TX to the cell A and the cell B through separate TX chains because the UE uses multiple TX chains.

The specific higher-layer signaling and the dynamic signaling may be collectively referred to as control signaling.

2-1. The control signaling (higher-layer signaling or dynamic signaling) is received from the (serving) cell A, and the cell A provides information necessary for the UE A to perform D2D TX to the cell B.

For example, the information may correspond to a D2D operation mode (D2D communication mode/D2D discovery mode) (e.g., Mode-2 communication and/or Type-1 discovery) when the UE A performs D2D TX to the cell B, information on a frequency/time at which D2D TX can be performed, etc.

2-2. D2D TX to the cell B performed by the UE A may be limited by previously defining a D2D operation mode (e.g., Mode-2 communication and/or Type-1 discovery) such that the UE A can perform only transmission in the defined D2D operation mode.

This is because D2D transmission/reception latency can increase due to backhaul delay between the cell A and the cell B when the cell A receives a dynamic indication such as a scheduling assignment (SA) and a D2D data grant in Mode-1 communication from the cell B through backhaul signaling and transmits the same to the UE A when the cell A is linked to the cell B through a non-ideal backhaul.

Accordingly, when a D2D communication mode in which the UE A performs transmission to the cell B is limited to Mode-2 communication, the cell A previously receives, from the cell B, a D2D resource pool configuration used in the cell B through backhaul signaling (e.g., X2-signaling) and notifies the UE A of the D2D resource pool configuration. Then, the UE A can select D2D transmission resources through random resource selection according to Mode-2 communication in a period in which D2D TX to the cell B can be performed and perform D2D transmission using the D2D transmission resources, reducing latency.

2-3. When the cell A and the cell B use the same CC #0 for D2D transmission and reception and the cell B uses CC #1 different from the CC of the cell A for D2D transmission and reception, the UE A can perform D2D transmission according to TDM defined in 1 of method 2 using a single TX (RF) chain while switching frequencies.

However, when the cell A and the cell B use the same CC #0 for D2D transmission (or for communication), it is desirable that D2D resources for the cell A and the cell B not overlap.

For example, when the UE A receives information about a D2D resource pool in which D2D TX to the cell B can be performed, if a received D2D resource of the cell B and a D2D resource of the cell A overlap, the UE A may operate to give priority to the cell A and ignore information related to the D2D resource (pool) of the cell B.

If parts of the D2D resource pools of the cells overlap, the UE A may perform D2D TX in a resource (pool) of the cell B other than the overlap resource region.

Alternatively, when only some D2D resources overlap, D2D TX may not be performed in the entire D2D resource (pool) of the cell B.

That is, the UE A does not perform D2D TX to the cell B and, when D2D resource pool information related to the cell B is received, can regard the same as an error case.

Further, operation 2.3 may be limited to only the above-describe case of a UE having a single TX chain.

In another embodiment, a UE having multiple TX chains may simultaneously perform different D2D TX operations through the D2D resource pool of the cell A and the D2D resource pool of the cell B using separate TX chains.

For example, such a situation may be frequency band aggregation (or carrier aggregation) for which at least unsynchronized simultaneous D2D transmission is supported.

In this case, an issue about power allocation to TX chains of the UE may be generated.

Basically, average TX power scaling with respect to the TX chains of the UE can be defined to be uniformly applied to the TX chains.

For example, when the UE performs simultaneous transmission through two TX chains, the UE can determine TX power of signals to be transmitted through the TX chains and reduce the TX power in the TX chains at the same scaling when the TX power exceeds an upper limit of maximum transmittable power of the UE such that the TX power does not exceed the upper limit of the maximum transmittable power.

In another embodiment, information related to power scaling with respect to the TX chains may be set (or signaled) to the UE through control signaling transmitted from the eNB such that the UE scales the TX power of the TX chains at a ratio of R_i when the TX power exceeds the upper limit of the maximum transmittable power to control the TX power not to exceed the upper limit of the maximum transmittable power.

As an example of the power scaling related information, power scaling ratio R_i of each TX chain i can be set per TX chain. Here, the sum of R_i can be normalized to 1.

2.4. Control information for performing operation (2) can be included in a handover related message and delivered to the UE.

In this case, details described in the aforementioned method 1.5 can be equally applied to 2.4.

2.5. To perform the aforementioned operations, the UE previously notifies the eNB of TX/RX chain information indicating the number of TX/RX (RF) chains thereof through a specific capability signaling transmission/reception (or exchange) procedure.

If the UE transmits information indicating that the UE uses multiple TX/RX chains to the cell (or eNB) through capability signaling, the cell (or eNB) does not provide the control signaling for D2D TX operation according to the TDM scheme.

Alternatively, even if configuration information related to D2D TX operation according to the TDM scheme is received, the UE regards the information as an error case and does not perform D2D TX operation according to the TDM scheme.

In this case, the UE can perform simultaneous D2D transmission if simultaneous transmission can be performed through the multiple TX chains.

Alternatively, the UE may (directly) notify, through capability signaling, the cell (or eNB) of information related to whether the TDM related operation is configurable or whether configuration of the TDM related operation is preferred, instead of directly signaling UE implementation related information such as the number of TX/RX (RF) chains thereof to the cell (or eNB).

2.6. In the operations of the aforementioned methods (2.1 to 2.5), when the cell A and the cell B are unsynchronized, timing at which the UE performs D2D TX to the cell A may differ from timing at which the UE performs D2D TX to the cell B.

Although "situation in which the cell A uses UL/DL CC #0 for WAN transmission/reception and additionally uses some resources of UL CC #0 for D2D transmission/reception" has been described as an example in the aforementioned method 2, the methods proposed in the present description can also be applied to a "situation in which the cell A uses UL/DL CC #0 for WAN transmission/reception and additionally uses CC #2 for D2D transmission/reception, that is, the cell A carrier-aggregates CC #0 and CC #2 and uses the same".

That is, when the D2D UE performs D2D TX using D2D resources in CC #1 of the cell B in a carrier aggregation (CA) situation, various UE operations such as an operation of applying D2D transmission according to the TDM scheme to CC #2 (for D2D TX/RX) and CC #1 (for D2D TX/RX) and performing simultaneous transmission through different TX chains from that for CC #0 (for WAN TX/RX) may be performed.

Alternatively, the UE can use a single TX chain for WAN communication (CC #0) and specific D2D communication (CC #2 or CC #1).

Here, WAN communication (CC #0) and specific D2D communication (CC #2 or CC #1) may be used in the single TX chain through a switching process (e.g., by TDM).

Other TX chains may be fixed for other D2D communication (CC #1 or CC #2; contrary to the specific D2D communication).

In such a case, when a CC for WAN communication and a CC for D2D communication, which are switched, correspond to the same component carrier, timing readjustment is required. On the contrary, when the CC for WAN communication and the CC for D2D communication, which are switched, correspond to different component carriers, WAN TX may be impossible for a predetermined time due to carrier switching.

Accordingly, it is desirable to newly define an exception rule for "WAN is prioritized".

For example, when D2D TX is performed in CC #x (e.g., it is assumed that CC #0 and CC #x have an inter-band relationship) (x=1 or 2 in the above examples), an exception operation period and rule can be newly defined such that WAN UL TX is dropped or is not transmitted in UL CC #0.

In this case, it may be desirable to set the exception operation period and rule in consideration of time of switching from CC #0 to CC #n and/or time of switching from CC #n to CC #0.

A situation in which handover from the cell A to the cell B is performed has been described as an example in the above-described methods proposed in the present description.

However, the methods proposed in the present description are not limited to handover operation.

As described above, when a specific condition such as a condition that a specific RRM management (e.g., RSRP, RSRQ or the like) result of the UE with respect to the cell B is equal to or greater than a predefined specific threshold X (dB) or a condition that a neighbor cell D2DSS strength (e.g., sidelink(S)-RSRP) is equal to or greater than a predetermined level is satisfied, the UE can (additionally) perform D2D TX to which an additional timing reference (e.g., timing of the cell B) has been applied in addition to serving cell timing, thereby minimizing a D2D TX block and securing seamless D2D communication connectivity.

For example, when the UE does not hand over from the cell A to the cell B (e.g., when the cell A has higher average DL RS received quality), if the predetermined condition is satisfied, the UE can perform D2D TX using not only D2D resources of the cell A but also D2D resources of the neighbor cell B (e.g., the aforementioned methods such as TDM, particularly, a case in which 2 TX chain can be used).

FIG. 16 is a flowchart illustrating an example of D2D transmission operation proposed in the present description.

First, a (D2D) UE transmits, to a serving eNB (or serving cell), TX/RX chain number information indicating the number of TX/RX RF chains supported thereby (S1610).

Then, the UE receives, from the serving eNB, a first control message including D2D resource pool configuration information of the serving eNB (S1620).

Subsequently, the UE receives, from the serving eNB, a second control message including D2D resource pool configuration information of a neighbor eNB (S1630).

The D2D resource pool configuration information of the neighbor eNB can be transmitted from the second eNB to the first eNB through backhaul signaling.

The second control message may further include D2D operation mode information related to transmission of a second D2D signal.

The second control message may be an RRC (Radio Resource Control) connection request message or a handover related message.

A D2D resource pool of the neighbor eNB may be a D2D resource pool specific to the second eNB or a common D2D resource pool commonly used in a plurality of eNBs.

When a predetermined condition is satisfied, the UE performs transmission of a first D2D signal to the serving eNB and/or transmission of the second D2D signal to the neighbor eNB using one or more TX RF chains (S1640).

Here, to transmit the second D2D signal, the UE performs D2D synchronization with the neighbor eNB with reference to downlink timing of the neighbor eNB.

Then, the UE can transmit the second D2D signal to the neighbor eNB on the basis of the D2D resource pool configuration information of the neighbor eNB.

The UE can transmit the second D2D signal including a reference signal generated by a specific scrambling seed value related to the neighbor eNB.

Further, the UE can transmit the second D2D signal by applying power control associated with the neighbor eNB thereto.

In addition, the UE transmits the first D2D signal for a first time period and transmits the second D2D signal for a second time period.

Furthermore, the UE can transmit the first D2D signal and the second D2D signal through the same component carrier (CC) or different component carriers.

Moreover, the UE can drop one of transmission of the first D2D signal and transmission of the second D2D signal when a D2D resource pool region of the serving eNB and a D2D resource pool region of the neighbor eNB overlap.

Further, the UE may not perform transmission/reception (WAN transmission/reception) to/from the first eNB during the second time period.

The predetermined condition may correspond to a case in which an RRM (Radio Resource Management) measurement result with respect to the neighbor eNB is equal to or greater than a predefined threshold, a case in which the strength of a D2D synchronization signal (D2DSS) received from the neighbor eNB is equal to or greater than a predetermined value or a case in which a command message for ordering execution of handover from the serving eNB to a target eNB is received.

General Apparatuses to which the Present Invention is Applicable

FIG. 17 is a block diagram of a wireless communication apparatus according to an embodiment of the present invention.

Referring to FIG. 17, a wireless communication system includes an eNB 1710 and multiple UEs 1720 located within the coverage of the eNB 1710. Here, the UEs 1720 may correspond to the aforementioned UE, node, device, RRH, relay, TP/RP, RSU and the like.

The eNB 1710 includes a processor 1711, a memory 1712 and a radio frequency (RF) unit 1713. The processor 1711 implements functions, processes and/or methods proposed in FIGS. 1 to 16. Radio interface protocol layers can be implemented by the processor 1711. The memory 1712 is connected to the processor 1711 and stores various types of information for driving the processor 1711. The RF unit 1713 is connected to the processor 1711 and transmits and/or receives radio signals.

The UE 1720 includes a processor 1721, a memory 1722 and an RF unit 1723. The processor 1721 implements functions, processes and/or methods proposed in FIGS. 1 to 16. Radio interface protocol layers can be implemented by the processor 1721. The memory 1722 is connected to the processor 1721 and stores various types of information for driving the processor 1721. The RF unit 1723 is connected to the processor 1721 and transmits and/or receives radio signals.

The memories 1712 and 1722 may be located inside or outside of the processors 1711 and 1721 and connected to the processors 1711 and 1722 through various known means. Furthermore, the eNB 1710 and/or the UE 1720 may have a single antenna or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memories may be located at the interior or exterior of the processors and may transmit data to and receive data from the processors via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

While examples in which channel estimation in the wireless communication system according to the present invention are applied to 3GPP LTE/LTE-A have been described, the present invention is applicable to various wireless communication systems in addition to 3GPP LTE/LTE-A.

The invention claimed is:

1. A method for performing, by a first user equipment (UE), device-to-device (D2D) communication in a wireless communication system, the method comprising:

transmitting, to a first evolved NodeB (eNB), transmission/reception (TX/RX) chain number information indicating the number of supported TX/RX radio frequency (RF) chains,
wherein the TX/RX chain number information is used for determining whether transmitting a first D2D signal to the first eNB and a second D2D signal to a second eNB at a different time by using time division multiplexing (TDM) or transmitting the first D2D signal to the first eNB and the second D2D signal to the second eNB at the same time;
receiving, from the first eNB, a first control message including first D2D resource pool configuration information of the first eNB;
receiving, from the first eNB, a second control message including second D2D resource pool configuration information of a second eNB,
wherein the second D2D resource pool configuration information is transmitted to the first UE before handover, and
wherein a second D2D resource pool allocated by the second D2D resource pool configuration information is used for D2D communication of the first UE, without handover or before completing handover; and
transmitting the first D2D signal to the first eNB and/or transmitting the second D2D signal to the second eNB using one or more TX RF chains when a predetermined condition is satisfied.

2. The method according to claim 1, wherein the transmitting of the second D2D signal comprises:
performing D2D synchronization with the second eNB with reference to downlink timing of the second eNB; and
transmitting, to the second eNB, the second D2D signal on the basis of the D2D resource pool configuration information of the second eNB.

3. The method according to claim 2, wherein the second D2D signal includes a reference signal (RS) generated by a specific scrambling seed value related to the second eNB.

4. The method according to claim 2, wherein power control related to the second eNB is applied to the second D2D signal.

5. The method according to claim 1, wherein transmission of the first D2D signal is performed in a first time period and transmission of the second D2D signal is performed in a second time period, and
wherein the first D2D signal transmission and the second D2D signal transmission are performed only in a predefined operation mode of the first UE.

6. The method according to claim 1, wherein transmission of the first D2D signal and transmission of the second D2D signal are performed using the same component carrier (CC) or different component carriers.

7. The method according to claim 6, wherein transmission of the second D2D signal is performed using some uplink resources of the second D2D signal when transmission of the first D2D signal and transmission of the second D2D signal are performed using the same component carrier.

8. The method according to claim 1, wherein transmission of one of the first D2D signal and the second D2D signal is dropped when a first D2D resource pool of the first eNB and the second D2D resource pool of the second eNB overlap.

9. The method according to claim 6, wherein, when part of the first D2D resource pool of the first eNB and part of the second D2D resource pool of the second eNB overlap, transmission of one of the D2D signals is dropped only in the overlapping resources.

10. The method according to claim 5, wherein transmission/reception to/from the first eNB is not performed in the second time period.

11. The method according to claim 1, wherein the second control message further includes D2D operation mode information related to transmission of the second D2D signal.

12. The method according to claim 1, wherein the second control message is a radio resource control (RRC) connection request message or a handover related message.

13. The method according to claim 1, wherein the second D2D resource pool of the second eNB is a D2D resource pool specific to the second eNB or a common D2D resource pool commonly used in a plurality of eNBs.

14. The method according to claim 1, wherein the predetermined condition corresponds to one of a case in which a radio resource management (RRM) measurement result with respect to the second eNB is equal to or greater than a predefined threshold, a case in which the strength of a D2D synchronization signal (D2DSS) received from the second eNB is equal to or greater than a predetermined value and a case in which a command message for ordering handover from the first eNB to a target eNB is received.

15. The method according to claim 1, wherein the second D2D resource pool configuration information of the second eNB is transmitted from the second eNB to the first eNB through backhaul signaling.

16. The method according to claim 1, wherein, when multiple TX RF chains are used, D2D signals are transmitted to eNBs using different TX RF chains.

17. The method according to claim 16, wherein, when the eNBs use different D2D resource pools, average TX power scaling is equally applied to the TX RF chains.

18. The method according to claim 16, further comprising:
determining TX power of the D2D signals transmitted through the TX RF chains; and
down-scaling the TX power of the D2D signals in the TX RF chains by the same value when the determined TX power exceeds an upper limit of a maximum transmittable power of the UE.

19. The method according to claim 16, wherein a specific TX RF chain among the multiple TX RX chains is used for transmission and reception of a WAN signal and transmission and reception of a D2D signal, and other TX RF chains are used for transmission and reception of a D2D signal only.

20. A first user equipment (UE) for performing device-to-device (D2D) communication in a wireless communication system, the first UE comprising:
a transceiver configured to transmit and receive a radio signal; and
a processor functionally connected to the transceiver,
wherein the processor is configured to:
control the transceiver to transmit, to a first evolved NodeB (eNB), transmission/reception (TX/RX) chain number information indicating the number of supported TX/RX radio frequency (RF) chains,
wherein the TX/RX chain number information is used for determining whether transmitting a first D2D signal and a second D2D signal at a different time by using time division multiplexing (TDM) or transmitting the first D2D signal to the first eNB and a second D2D signal to the second eNB at the same time;
control the transceiver to receive, from the first eNB, a first control message including first D2D resource pool configuration information of the first eNB;

control the transceiver to receive, from the first eNB, a second control message including second D2D resource pool configuration information of a second eNB, wherein the second D2D resource pool configuration information is transmitted to the first UE before handover, and wherein a second D2D resource pool allocated by the second D2D resource pool configuration information is used for D2D communication of the first UE, without handover or before completing handover; and control the transceiver to transmit the first D2D signal to the first eNB and/or transmit the second D2D signal to the second eNB using one or more TX RF chains when a predetermined condition is satisfied.

* * * * *